(12) United States Patent
Blackstone

(10) Patent No.: US 6,901,769 B2
(45) Date of Patent: *Jun. 7, 2005

(54) AIR COOLING DEVICE

(76) Inventor: Ralf Blackstone, 1860 Venetian Point Dr., Clearwater, FL (US) 33755

( * ) Notice: Subject to any disclaimer, the term of this patent is extended or adjusted under 35 U.S.C. 154(b) by 3 days.

This patent is subject to a terminal disclaimer.

(21) Appl. No.: 10/453,437

(22) Filed: Jun. 3, 2003

(65) Prior Publication Data

US 2004/0011073 A1 Jan. 22, 2004

Related U.S. Application Data

(63) Continuation-in-part of application No. 09/886,588, filed on Jun. 21, 2001, now Pat. No. 6,571,574.
(60) Provisional application No. 60/388,842, filed on Jun. 14, 2002, and provisional application No. 60/403,752, filed on Aug. 14, 2002.

(51) Int. Cl.[7] ............................ F25D 3/02; F25D 19/02; B60H 1/32
(52) U.S. Cl. ............................ 62/420; 62/421; 62/425; 62/448; 62/327
(58) Field of Search ........................................... 62/420

(56) References Cited

U.S. PATENT DOCUMENTS

| 3,468,299 A | | 9/1969 | D'Amato |
| 3,839,621 A | * | 10/1974 | Hariu ........................ 219/211 |
| 4,055,173 A | | 10/1977 | Knab |
| 5,733,318 A | * | 3/1998 | Augustine ................... 607/104 |
| 6,269,651 B1 | * | 8/2001 | Price ........................... 62/255 |
| 2002/0056281 A1 | | 5/2002 | Bieberich |
| 2002/0058975 A1 | | 5/2002 | Bieberich |
| 2003/0029182 A1 | | 2/2003 | Augustine et al. |
| 2003/0079488 A1 | | 5/2003 | Bieberich |

* cited by examiner

Primary Examiner—Cheryl J. Tyler
Assistant Examiner—Filip Zec
(74) Attorney, Agent, or Firm—Jackson Walker LLP

(57) ABSTRACT

A portable air chiller for providing air conditioning in a variety of environmental circumstances. The portable air chiller includes an insulated container capable of effectively containing a endothermic substrate, an in-flow vent and out-flow vent positioned to communicate air flow from the exterior of the container to the interior of the container. A fan located in the out flow vent facilitates conditioned air movement out of the interior of the portable air chiller. The interior of the portable air chiller houses a endothermic substrate holder which practically traverses the length and width of the interior.

22 Claims, 20 Drawing Sheets

AIR COOLING DEVICE

This application is a continuation in part of U.S. patent application Ser. No. 09/886,588, filed Jun. 21, 2001 now U.S. Pat. No. 6,571,574 and claims priority from provisional patent applications 60/388,842, filed Jun. 14, 2002 and 60/403,752, filed Aug. 14, 2002.

FIELD OF THE INVENTION

Air cooling devices, more specifically, an air cooling device comprising an endothermic substrate bearing container with an air circulation means for circulating air from outside the container, about the endothermic substrate and, chilled, exhausted from the container.

BACKGROUND

Humans can function optimally, in comfort, over only a fairly narrow ambient temperature range. Adjustment of the amount and type of clothing will afford some relief from ambient temperature, especially adding clothing for comfort in a cold environment. However, as temperature rises conditioning the ambient air, typically by some form of heat extraction often, is the only solution to maintaining a comfortable, tolerable air temperature. Typically, such heat extraction is performed by air conditioners. Air conditioners operate on the principle of heat absorption as a composition such as freon or other refrigerant changes phase from a liquid to a gas. Water, for example, will absorb about 550 calories of heat per gram when changing from water at 100° C. to water vapor at 100° C. (at one atmosphere of pressure). On the other hand, one gram of water will release 540 calories of heat when changing from water vapor at 100° C. to liquid water at 100° C. Air conditioners, however, are heavy, expensive and complex. Also, they require compressors to provide energy to power the gas to liquid phase change. Furthermore, they are designed to condition air masses defined by buildings or vehicle structures such as a room of a building or an interior compartment of a vehicle, rather than conditioning the air directly adjacent to the body of an occupant, that is, the occupant's "microenvironment".

Air conditioners are undesirable, for example, in cooling a cabin of a small or light aircraft such as a 2, 4 or 6 place airplane. In such light aircraft, there is a fairly small cabin space and anything that adds weight to the aircraft decreases its performance and payload. Thus, many light aircraft do not have air conditioning systems. Moreover, complicating this deficiency is the often limited ability to move air between the outside and the inside of the aircraft via ducts or windows. Thus, it may often get quite warm in the small interior cabin space of a light aircraft, especially when it is parked or tied down for a period of time on an airport apron. The warm air cabin environment of a light aircraft is not conducive to the concentration required for the pilot to operate the aircraft, especially during critical take-off or landing procedures. After the aircraft climbs to altitude, the outside air is usually sufficient to cool, even with small ducts, the interior of the aircraft cabin. However, this does not help when the aircraft has been sitting for a period of time in the hot air on the ground.

OBJECT OF THE INVENTION

What is needed and has heretofore been unavailable is a small, light, efficient, simple and inexpensive device for cooling a small cabin area or the occupant's microenvironment.

SUMMARY OF THE INVENTION

Applicant provides for these and other objects of the invention by providing a light, inexpensive air cooling and distribution system for use in a vehicle or with the microenvironment of an occupant.

Applicant provides for these and other objects by providing an air cooling device which is capable of cooling either cabin air or the occupant's microenvironment through the use of a heat absorbing mass.

Applicant achieves these and other objects by providing a small, light, air cooling device comprising an insulated container containing an endothermic substrate which will absorb heat upon changing phase and, which further includes a means for distributing ambient air across the endothermic substrate and distributing the cooled air.

Applicant provides to these and other objects by providing a small inexpensive lightweight air distribution cooler distribution system for a vehicle that is powered by the vehicle's electrical system.

DETAILED DESCRIPTION OF THE PREFERRED EMBODIMENTS

A first embodiment of Applicant's novel beat reduction device (10) is found in FIGS. 1, 1A, 1B and 2. With reference to these figures and those that follow, it is seen that Applicant provides a heat reduction system (10) comprising an insulated container, typically a six sided rectangular box (12), the box including a lid (14), typically insulated. The walls of the box (12) including where the removable lid (14) is fitted as part thereof are sealed except as provided with the vents, etc., as set forth below. The box (12) may be manufactured from one or more of the following: plastic, foam or any other suitable insulating material. The box may have any number of shapes including the rectangular shape illustrated. Typical dimensions for a rectangular box are approximately 15" in width, 17" in height and.

Figure 1:
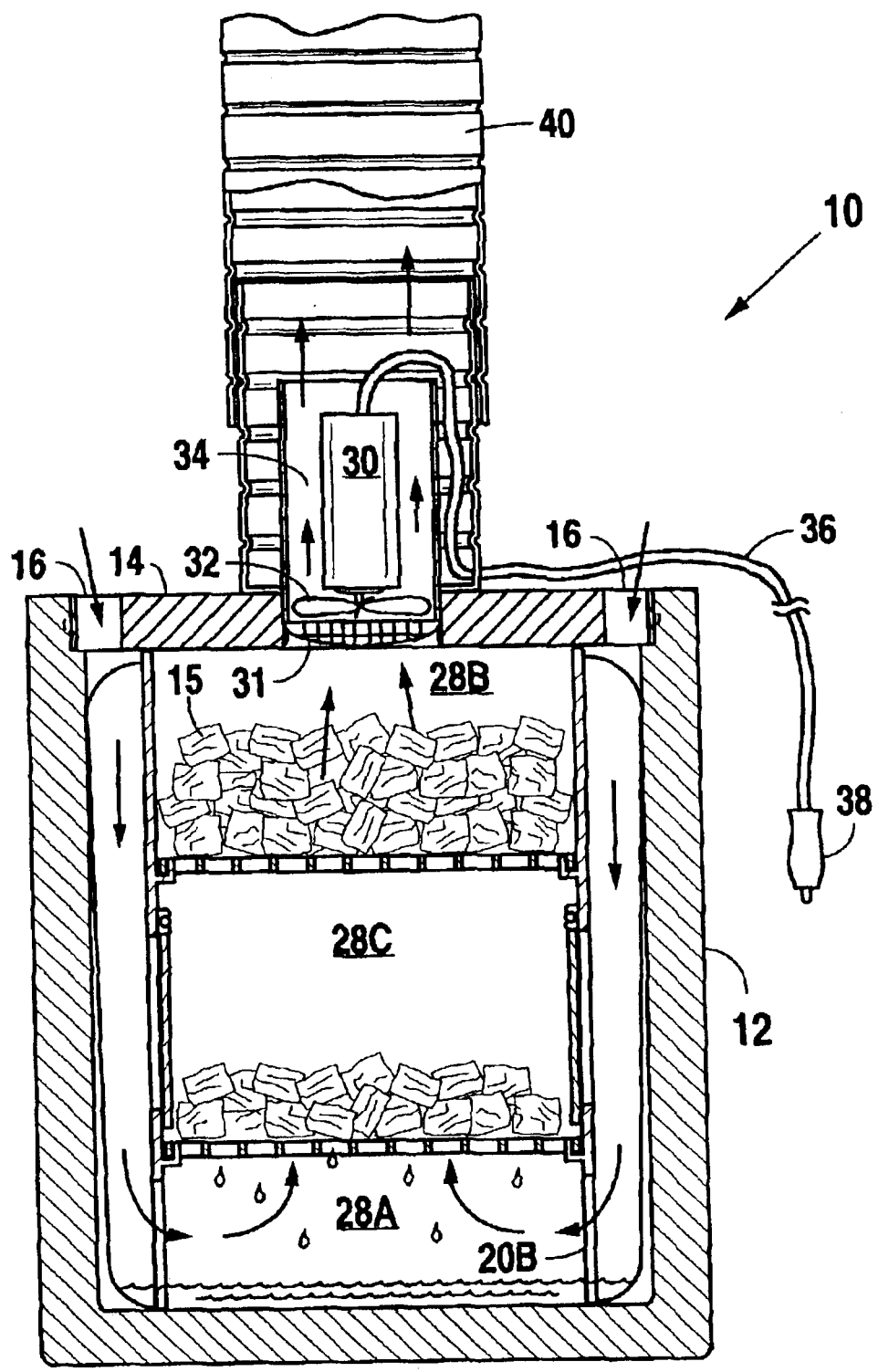
FIG. 1 is a cross section elevational view of Applicant's air cooling device with masses of ice supported on a frame in the container thereof
Figure 1A:
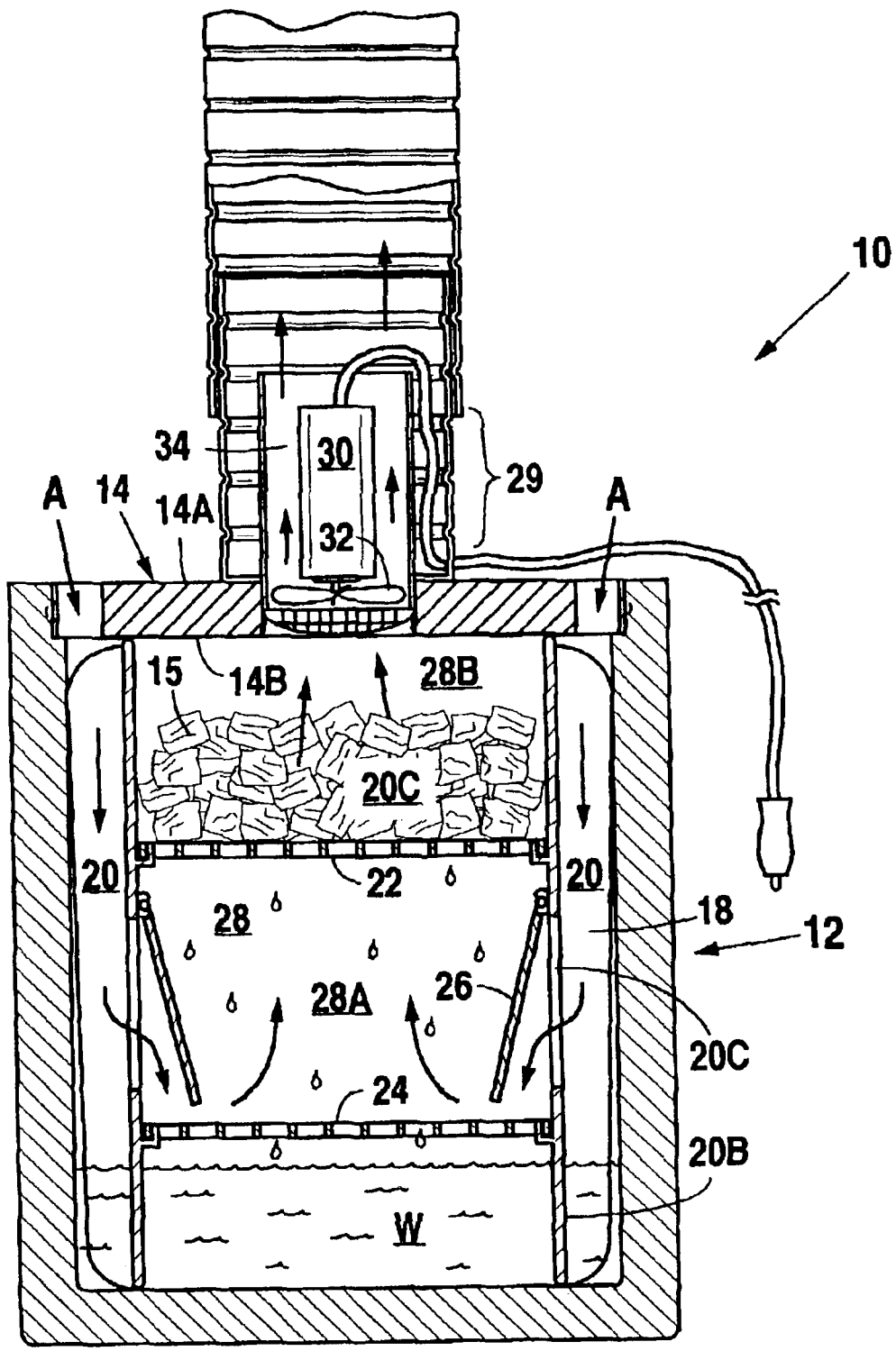
FIG. 1A is a cross sectional device of Applicant's air cooling device with some of the ice melted and showing the blower motor energized and air being drawn through the device.

Applicant's novel invention includes providing for placement within the box (12) (typically by removing the lid and placing it therein), an endothermic substrate (15). The endothermic substrate (15) is a mass of a composition which will absorb heat in undergoing a phase change, for example from a solid to a liquid or from a solid to a gas, which phase change and heat absorption typically occurs at temperatures below about 70° F. Illustrated as one such endothermic substrate in FIGS. 1 and 1A is a mass of ice, here illustrated as a multiplicity of ice cubes. Water typically freezes at 0° C. (32° F.) and, one gram of ice at 0° C. will absorb 80 calories of heat in a phase change to water at 0° C. The water so formed, will in turn continue to absorb heat at the rate of one calorie per gram until equilibrium with the environment is reached. Thus, Applicant provides an endothermic substrate (15) which may be placed inside the insulated box (12) and will absorb heat undergoing a phase change. Substrates other than ice may be used, for example: "dry ice" ($CO_2$ which will sublimate, or change from a solid directly to a gas), "blue-ice/gel packs" or other similar substrates.

It is noted that box (12) includes walls defining air intake vents or slots (16). In the embodiment illustrated in FIGS. 1, 1A, 1B and 2, it is seen that air intake slots (16) are incorporated into lid (14) of box. However, other walls of the box including the side walls may be used to define air intake slots (see for example FIG. 6). The function of the air intake slots (16) is to provide a means for air outside of the container to enter the container. See FIG. 6A for use of a quarter cylinder door (59) for use in conjunction with lid and slots 16. Here door (59) includes hinges (59A) on which door member (59B) hangs, which optionally may have a weight (59C) to help it maintain vertical or closed position when the blower motor (30) is off.

Typically, endothermic substrate (15) is supported within the interior of the insulated container or box (12) through the use of a frame (18). For example, with reference to FIGS. 1, 1A, and 3, it is seen that frame (18) is made up of a number of components. These include duct work/support legs (20) and a number of grid platforms here, upper and lower grid platforms (22) and (24), respectively. It is seen that frame (18) comprises an assembly that can support grid platforms (22) and (24) bearing an endothermic substrate (15) while allowing air to pass through, and, in the embodiment illustrated in these figures, also incorporates duct work engageable with the insulated container (12) to guide air entering the container through the air intake slot (16) (see FIGS. 1 and 1A).

Different types of frames may be used to hold the endothermic substrate (1S) within the box (12). Typically, a frame will provide the longest possible path for contact between the air and the substrate (15).

Figure 3:
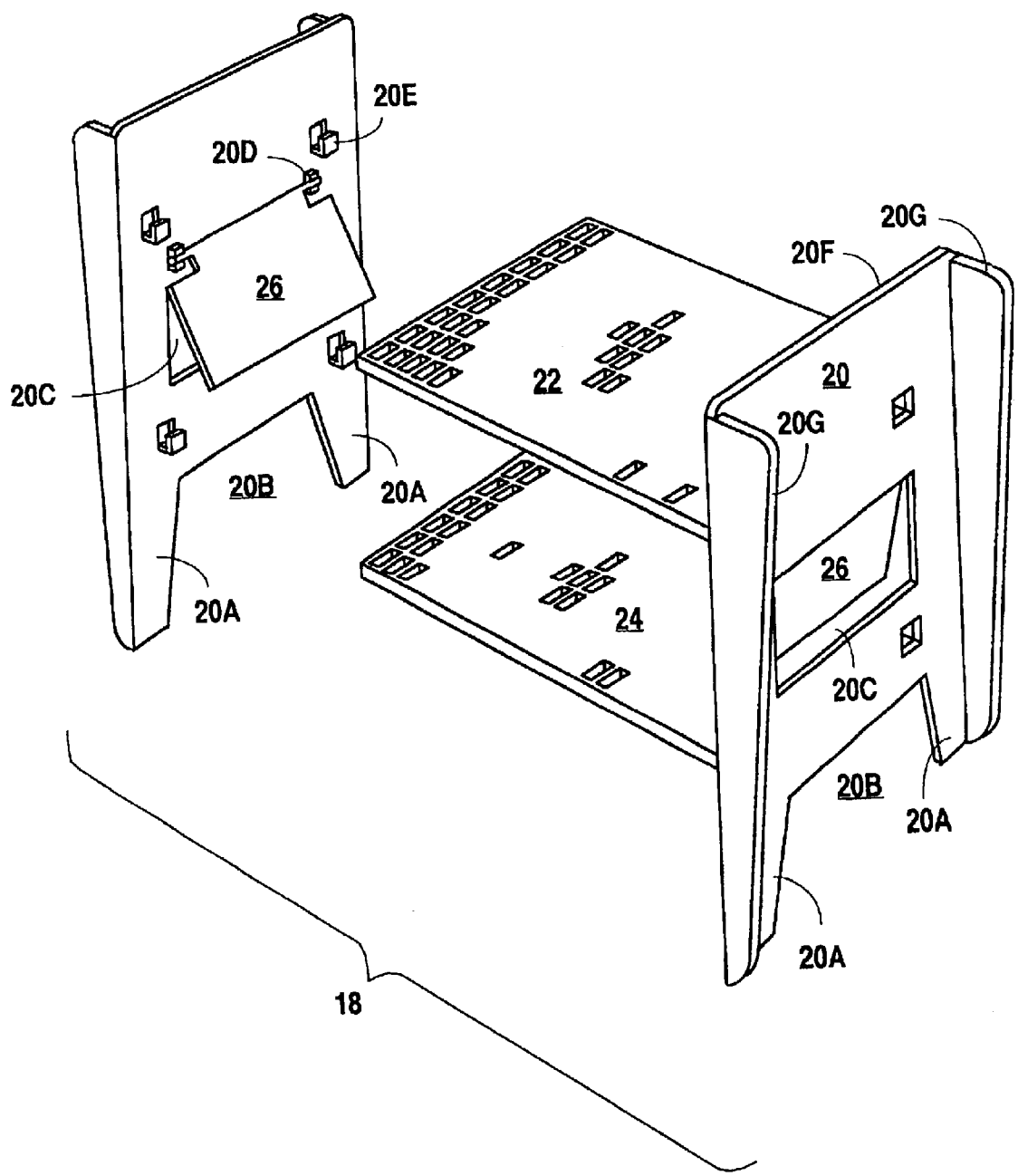
FIG. 3 is a exploded perspective view of the frame that is incorporated in the container of Applicant's cooling device.

Turning now to FIG. 3 for further details of the frame, it is seen that duct work/support legs (20) include depending members (20A) for holding and maintaining the grid platforms (22/24) above the bottom surface of the interior of the container. The depending leg members (20A) also have an opening therebetween defining a primary intake vent (20B) through which intake air may circulate (see FIG. 1). It is seen with reference to FIGS. 1A and 3 that frame (18) also defines a secondary intake vent (20C). This is an opening through which air may move as seen in FIG. 1A when water (from the melted ice) blocks the primary intake vent (20B). The secondary intake vent (20C) is controlled by a secondary intake valve (26) which is mounted on valve mounting stubs (20D) so as to hang vertically under the weight of gravity against the inner walls of duct work/support legs (20). It is seen then that if the air pressure is lowered inside of the frame such as would be the case if the air were evacuated from the interior space of the frame (as seen in FIG. 1A), the secondary intake valve (26) will move inward or away from the walls of the duct work/support legs (20) (assuming no ice is blocking this movement). Finally, it is seen that walls of duct work/support legs (20) also define grid platform support stubs (20E). These will engage a portion of the grid platforms (22/24) to support the grid platforms above the floor of the interior of the box or container (12).

Figure 4:
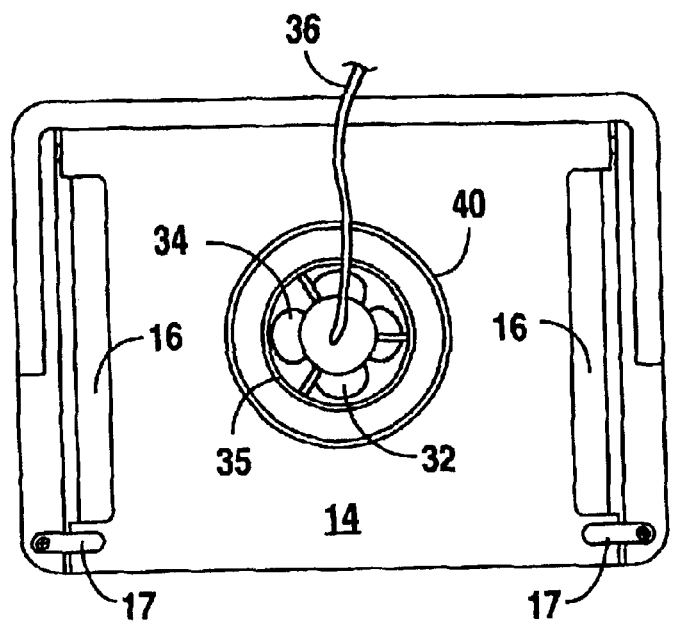
FIG. 4 is a top elevational view of the blower motor inlet of Applicant's air cooling device.

A blower (29) is provided for engagement with the box (12) to remove air from the interior of the box as seen in FIGS. 1 and 1A. Blower (29) may consist of a blower motor (30) such as an electrical powered motor, the motor (30) attached to a blower prop or fan (32). The blower (29) may be attached to the box (12) at any point, but illustrated here is the incorporation of the blower to a portion of the lid which contains a lid cutout (31) here shown with a protective screen (31A). The blower fan (32) is positioned in the plane of lid cutout (31) and with motor (30) engaged, it is seen that blower (29) will evacuate air from the interior of the box (12) out a blower duct (34) into one or more cool air distribution ducts (40) (see FIG. 2). Note that blower motor (30) is typically provided with aircraft electrical system interface or connector (38) which in turn is connected to the blower motor (30) to one or more blower motor leads (36). Aircraft electrical system interface (38) may be a commercial off the shelf unit which is designed to engage a cigarette lighter as an electrical energy source port or any auxiliary energy source port of the aircraft electrical system. Blower motor (30) is typically supported in the blower duct (34), centrally located and axially aligned therewith via the use of blower motor mount slots (35) (see FIG. 4).

Figure 1B:
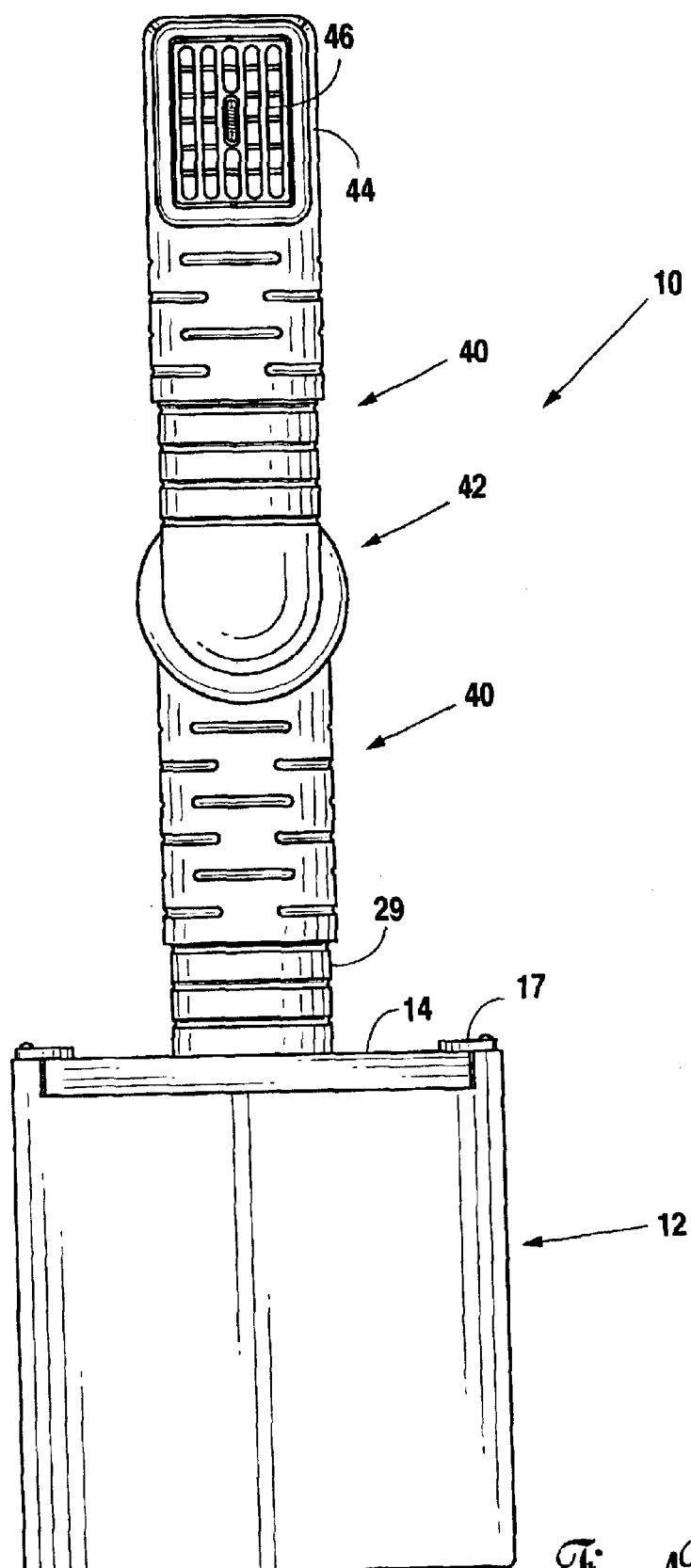
FIG. 1B is a front elevational view of Applicant's air cooling device.
Figure 2:
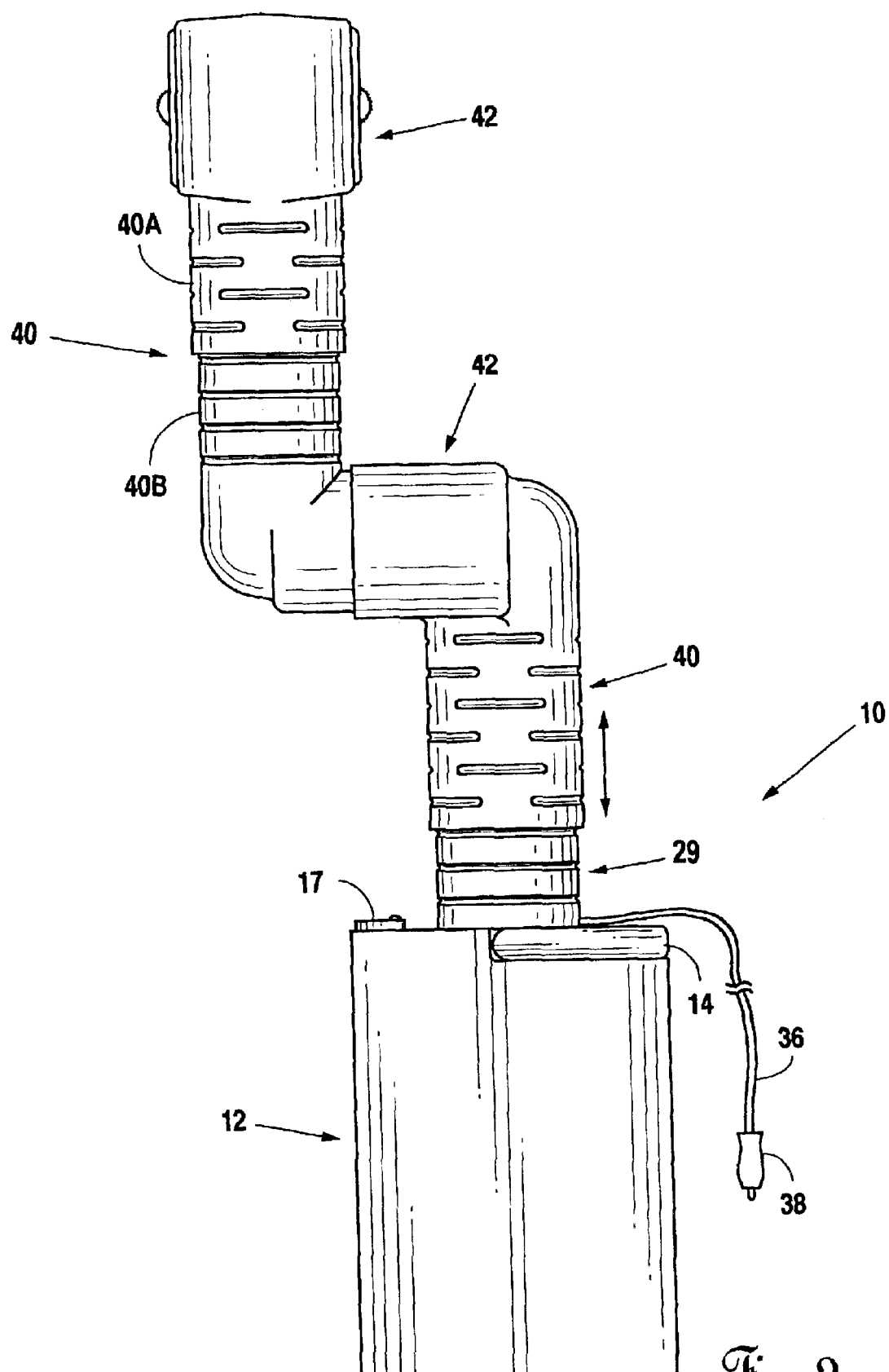
FIG. 2 is a side elevational view of Applicant's air cooling device.

Note with reference to FIGS. 1B and 2 that cool air distribution ducts (40) may include cool air duct elbows (42), cool air outlet nozzles (44), and cool air directional adjusters (46). Both the cool air duct elbows (42) and outlet nozzles (44) are also designed to physically adjust both vertically and horizontally to the user needs. Specifically cool air duct elbows (42) enables a user to position outlet nozzles (44) by rotating the air duct elbows (42) on its axis to direct air flow. Outlet nozzles (44) are designed to be raised and lowered on a vertical axis to also direct air flow, by using telescoping air distribution ducts (40A/40B) (see FIG. 2). Both embodiments are designed to allow the heat reduction system (10) to remain functional while positioning the outlet nozzle (44). The cool air ducting system may be either spiral wound tubing or made from high density polyethylene plastic (HDPE) or any other suitable material.

Turning now to the interior of the box or container (12), it seen that ice or other endothermic substrate (1S) may be provided on one or more of the elevated grid platforms (22) and (24). Turning to FIG. 1, for example, ice is provided on both platforms, the upper and the lower, and with ice on the lower platform when the motor (30) is energized and air is directed through the air intake slots (16) and through the primary intake vent (20B), it will go through the openings in the grid platform around the ice and cool as it moves through the ice in both platforms and but the motor duct. Therefore, it is seen that the interior of the box of a preferred embodiment illustrated in FIGS. 1, 1A, 1B, 2 and 3 may be categorized into three sections or zones, a warm air zone (28A) which represents the zone or location in the interior of the warm air coming in from outside of the box (12) before striking any ice. A second zone is a transition zone (28C) where warm air is in the process of being cooled. For example, in FIG. 1, the transition zone is located from the bottom of the lower grid (24) to the top of the ice on the upper grid (22). This air is actively being cooled as opposed to being below (or downstream) or above (or upstream) the ice. The third zone within the chamber is cool air zone (28B) which is above or upstream of the last of the ice or other endothermic substrate (I 5). Note that as heat is absorbed by the phase change occurring in the melting of the ice, the warmest air will be first striking the ice on the lower grid (24). As the ice melts, water will drip to the bottom of the box (12) and will rise to a point where it may occlude primary intake vent (20B) (see FIG. 1A). With the motor (30) running, this will allow secondary intake valve (26) to open and air to flow through secondary intake vent (20C). This air will then proceed through the ice or other endothermic substrate (15) located on the upper grid platform (24) and be exhausted out of the interior of the box (12) through motor duct (34). The arrangement and number of the grids and air intakes within the interior of the box (12) may be several. The function, however, is to provide for the passage of air from vents or slots (16) into the interior and across or adjacent an endothermic substrate (15) such that there may be a heat exchange between the endothermic substrate absorbing heat (and typically undergoing a phase change) and the air adjacent the endothermic substrate (1S) losing heat (cooling off) as it moves through the box and, eventually leaves through duct work or other arrangements.

Figure 5:
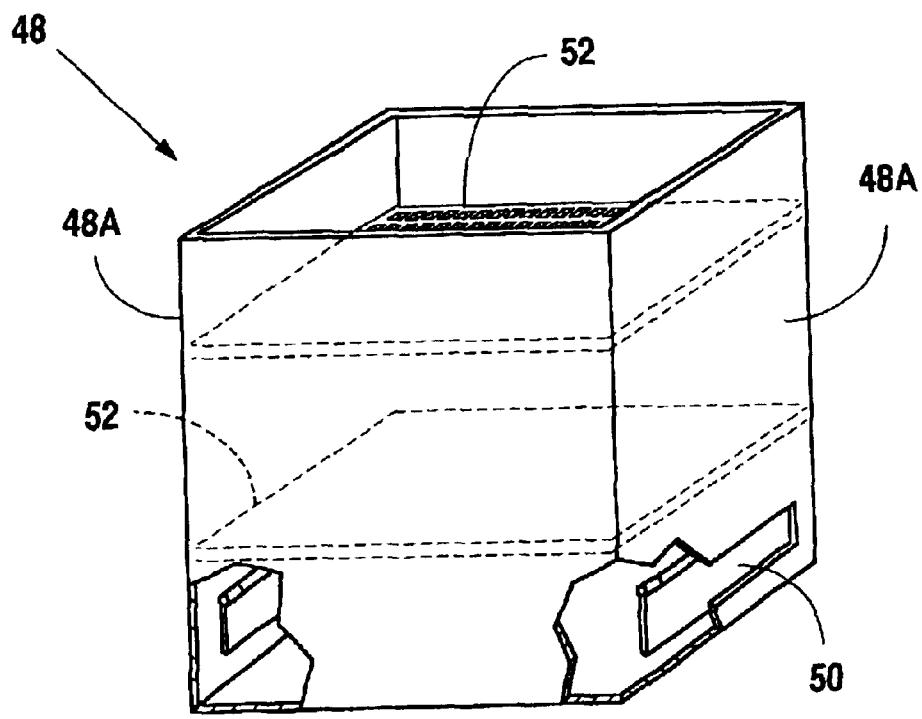
FIG. 5 is a perspective elevational view of the drop-in box of Applicant's present invention.

Turning now, for example, to FIG. 5, it is seen that in lieu of frame (18) there may be a drop-in box (48) which will fit within the interior of box (12), which drop-in box (48) includes walls (48A) and at the bottom thereof lower intake vents (50). The drop-in box (48) also includes between walls (48A) substrate support members (52) upon which may be placed an appropriate endothermic substrate (15) for elevation above lower intake vents (50). However, with the lower intake vents (50) in the position illustrated in FIG. 5, this embodiment would typically provide for an endothermic substrate (15) which is self-contained and does not drip to leave a liquid phase at the bottom of the box (12) so as to occlude or block lower intake vents (50). Such substrates may include dry ice or blue ice gel packs. With the blue ice gel pack, when the liquid contained therein undergoes a phase change from solid to liquid, it will not drip to the bottom of the box (12) because it is contained in a pouch or other membrane. Dry ice on the other hand, will sublimate directly from the solid phase to the gaseous phase.

Figure 6:
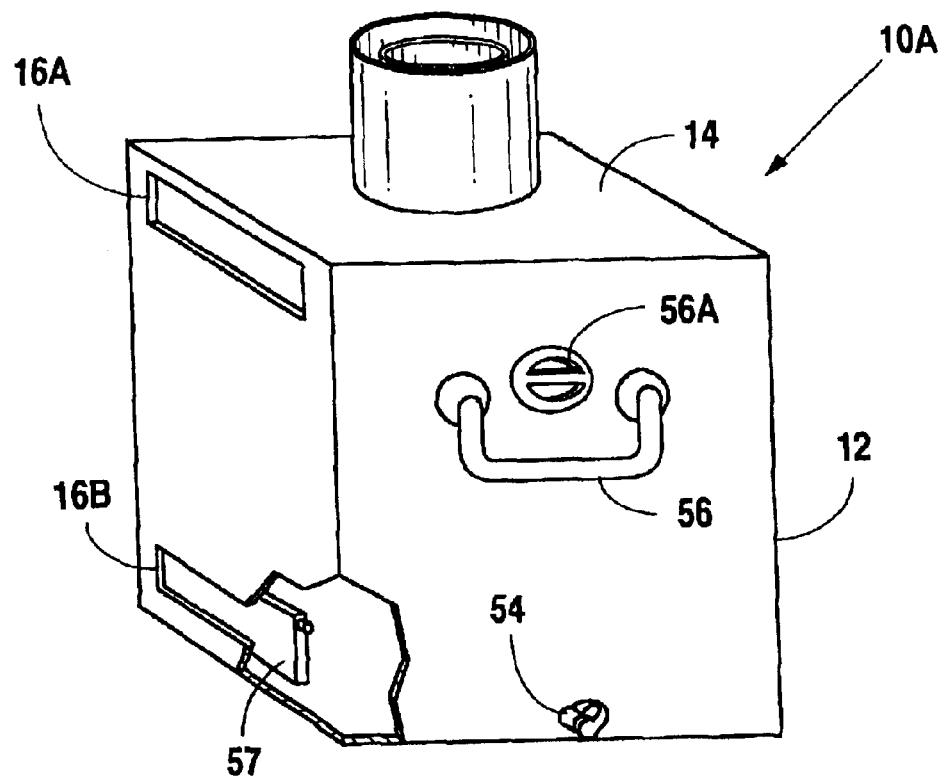
FIG. 6 is an alternative preferred embodiment of Applicant's air cooling device.
Figure 6A:
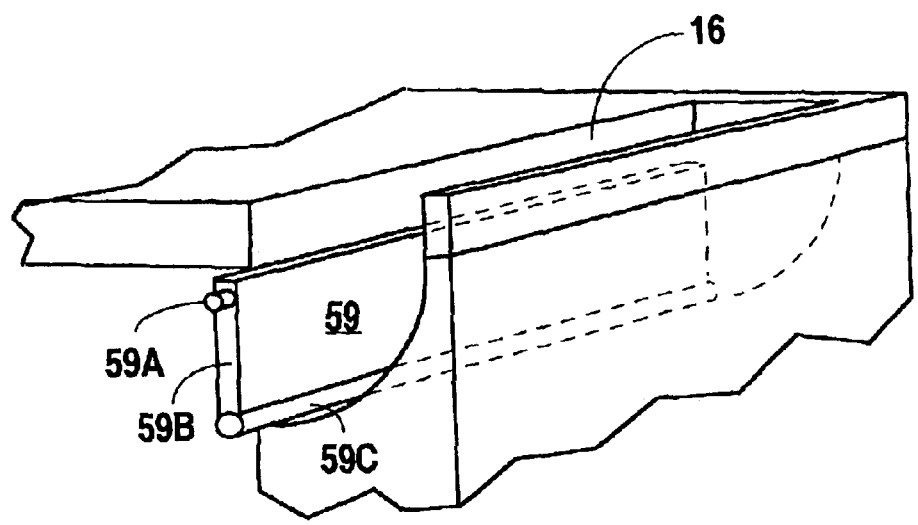
FIG. 6A is a partial view of intake vents of Applicant's air cooling device which utilize door closer means.

FIG. 6 illustrates an alternate preferred embodiment of Applicant's heat reduction system (10A). This embodiment has, in place of or in addition to the air intake slot (16) (see FIG. 1) located in or as part of lid (14), side air intake slots (16A) (upper) and/or (16B) (lower). If the endothermic substrate (15) to be used is one which does not release the liquid for accumulation in the bottom of the box (12), then the lower air intake slots (16B) may be used and frame (18), of whatever configuration, or drop-in box (48) will hold or maintain the endothermic substrate (15) above or upstream of the lower slots. On the other hand, upper slots (16A) represent a preferred alternative to slots (16) which are found in the lid (14). However, if upper slots (16A) are to be used, then it is typical that a liquid forming endothermic substrate (15) will be used which will accumulate a liquid in the bottom of the box (12). Moreover, if upper slots (16A) are used, then it is likely that there is either flue or duct work inside of the box (12) that will direct air entering upper slots (16A) down to or near the bottom of the box (12) and vents to allow the same air to go up and through the endothermic substrate (15). FIG. 6 also illustrates the use of a drain (54). A drain is an accessory feature that will allow a liquid accumulating on or near the bottom of the lid to be drained. An additional optional feature illustrated in FIG. 6 are handles (56) or tic-down points (56A) which may be provided on one or more sides of the exterior of the box (12) for convenience in handling and carrying the unit or securing the unit in a vehicle.

FIG. 6 illustrates the flaps (57) which may be used with the side air intake slots (16A) and/or (16B) as set forth in FIG. 6. Flaps (57) include wall member (57A) for sealing off the slot when the motor (30) is not energized. The wall member (57A) pivots on a pair of hinge ends (57B) mounted on the interior wall of the cabinet just above the top of the side wall mounted intake slots to allow the flaps (57) to hang vertically and close slot when the motor (30) is off. While the air intake slots (16A) and (16B) may be left open, a flap (57) is desirable in order to minimize exposure of the air outside the box (12) to the endothermic substrate (15) when the unit is not in operation. Note that the lid (14) located air intake slots (16) (see FIG. 1) may also have a variation of the flap (57), namely one that may be normally closed via spring loaded, hydraulic or even electric means, in conjunction with the motor (30) such that when the motor (30) is running the flap (57) is at least partially open. See FIG. 6A for use of a quarter cylinder door (59) for use in conjunction with lid and slots 16. Here door (59) includes hinges (59A) on which door member (59B) hangs, which optionally may have a weight (59C) to help it maintain vertical or closed position when the blower motor (30) is off. The gravity mounted flaps, of course, can respond to the change in pressure between the outside of the box (12) and the inside that is created when the motor (30) is energized by opening.

FIG. 6B is a perspective view of alternate preferred embodiment of intake slot 116 of lid 14 which alternate preferred embodiment includes a lid door 116A dimension to effectively block off the opening defining a lid slot 116. The lid door 116A is biased into a closed position with the use of a counterweight 116B which may be hung from a hinge point 116C. The hinge point will allow the lid door to articulate and counterweight 116B which is offset below hinge point 116C on a support strut 116D will hold the door in a closed position absent a vacuum drawn in the container.

Applicant's unit is powered by a blower motor (30). This motor is attached to a high speed fan or prop (32) which is responsible for sucking outside air through vents, then substrate and blowing out the resulting cool air through the ducting system to cool the user or cabin air mass. Each heat reduction unit typically has at least one motor, but, depending on the size of the unit's substrate mass and the heating requirements, may have multiple motors. These motors may be mounted in the lid (see FIG. 7), but other mounting locations on and off the box (12) may be used.

Applicant's blower motor (30) may be electrical, either AC or DC. Pneumatic motors are also possible. AC motors may be 110 volts, 220 volts or other available AC voltage. DC motors may be 6 volts, 12 volts, 24 volts, 28 volts or any workable voltage, depending upon the power availability in the environment in which it is used. Pressures for a pneumatic or hydraulic motor will also depend on availability by may be available from a duct mounted on the aircraft exterior. The motor is sized to deliver sufficient air flow through the endothermic substrate sufficient to cool the user or intended target. For example, Applicant has tested 3-inch 12 volt or a 24 volt DC motor capable of delivering 140 standard cubic feet per minute and a 4-inch 12 volt or 24 volt DC motor capable of delivering 245 standard cubic feet per minute which both proved satisfactory.

Figure 11:
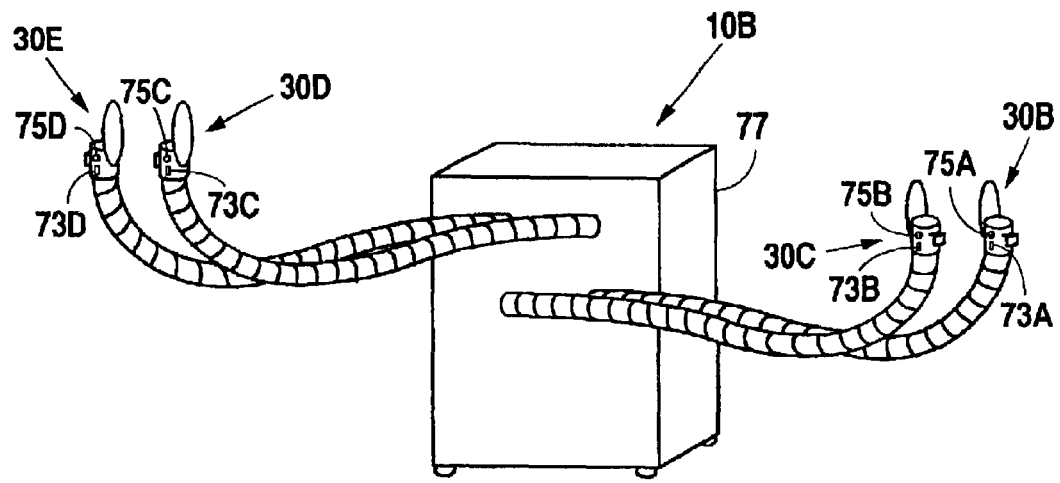
FIG. 11 is an alternate preferred embodiment of Applicant's present invention.
Figure 14:
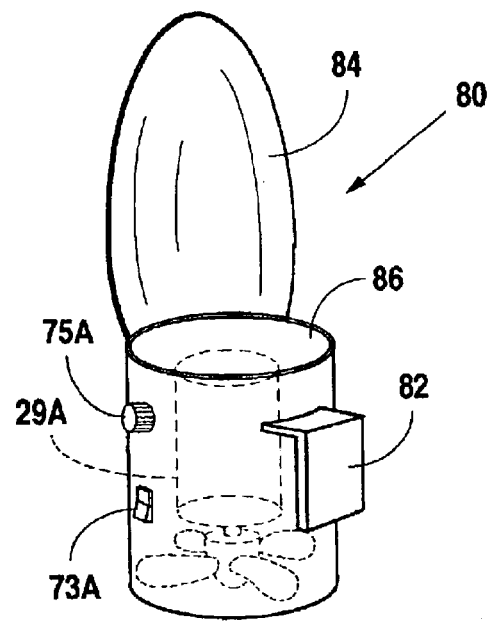
FIGS. 13A, 13B and 14 are all various adaptations of Applicant's micro cooling nozzles adapted for use with cooling air adjacent an individual.

In an alternate preferred embodiment, Applicant provides a multiplicity of individual motors either mounted in the lid, (see FIG. 7) or at the outlet end of the duct work (see FIGS. 11 and 14). With such an embodiment, each user may have a switch to turn on his or her motor and a rheostat or other fan motor speed control device to control the velocity of the air through the duct. The motor still functions the same, however, sucking air through the intake slots past a substrate and through duct work to be directed at a user or intended target.

Figure 7:
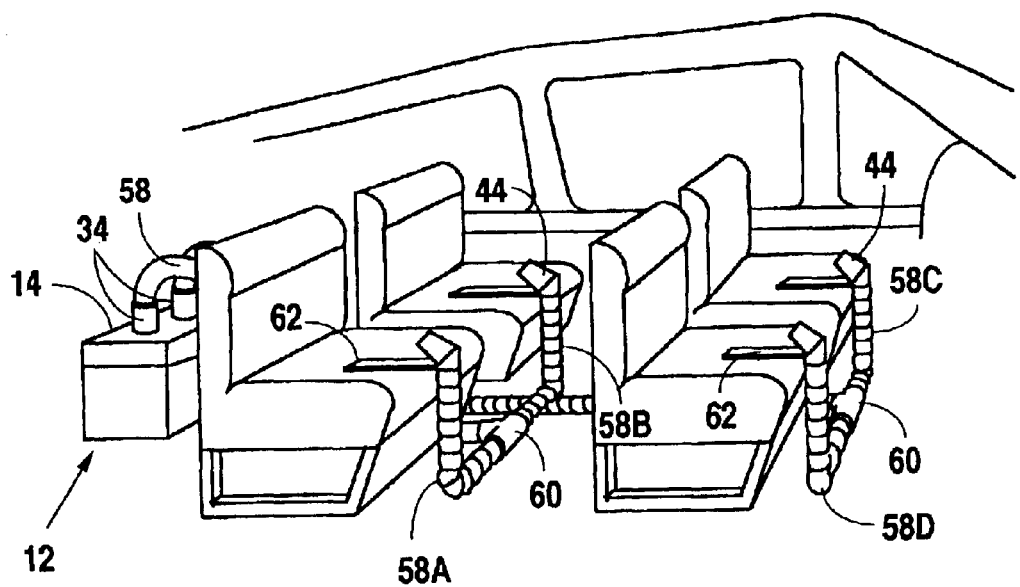
FIG. 7 is an illustration of an environment, here the interior of an aircraft, in which Applicant's air cooling device is used which illustration also features some of the additional features of Applicant's air cooling device.

FIG. 7 illustrates a system of duct work comprising spiral wound tubes (58) which attach to the blower duct (34) and may include splitter T's (60) for splitting the airflow between a number of branches (58A, 58B, 58C or 58D). At the removed end of the spiral wound tubes are typically provided cool air outlet nozzles (44) that may or may not include directional adjuster (46). In the embodiment illustrated in FIG. 7, attached to the tubes (58) at or near the removed end and thereof is a flat positioning member (62) that is intended to extend, part way across a seat as illustrated such that an occupant may sit with the positioning member between his body and the seat and therefore maintain a position adjacent the seat with the nozzle directed anywhere (see FIG. 13B), as for example across the occupant's crotch, abdomen, torso and even face if the user so desires.

Figure 8:
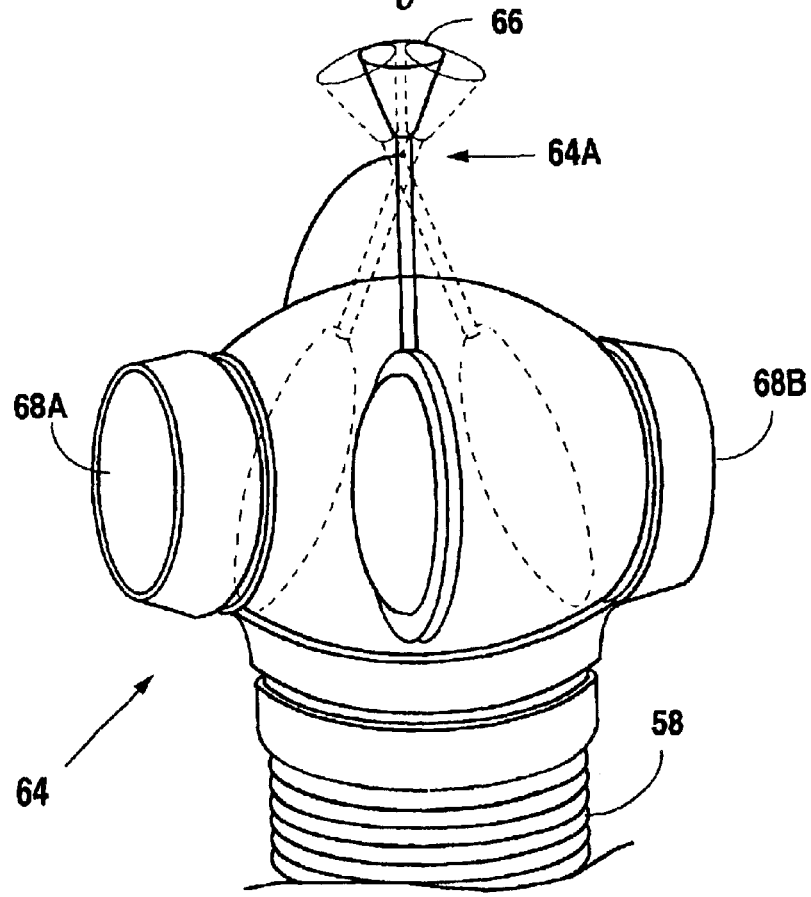
FIG. 8 is an alternative preferred embodiment of an outlet nozzle of Applicant's present invention.

FIG. 8 illustrates variable outlet valve (64) with a selector switch (64A) with a control knob (66) incorporated therewith that may direct air between either one or both of a pair of cool air outlets ports (68A) and (68B). The selector switch may be mounted to the end of the spiral wound tube or tubing (58).

Figure 9:
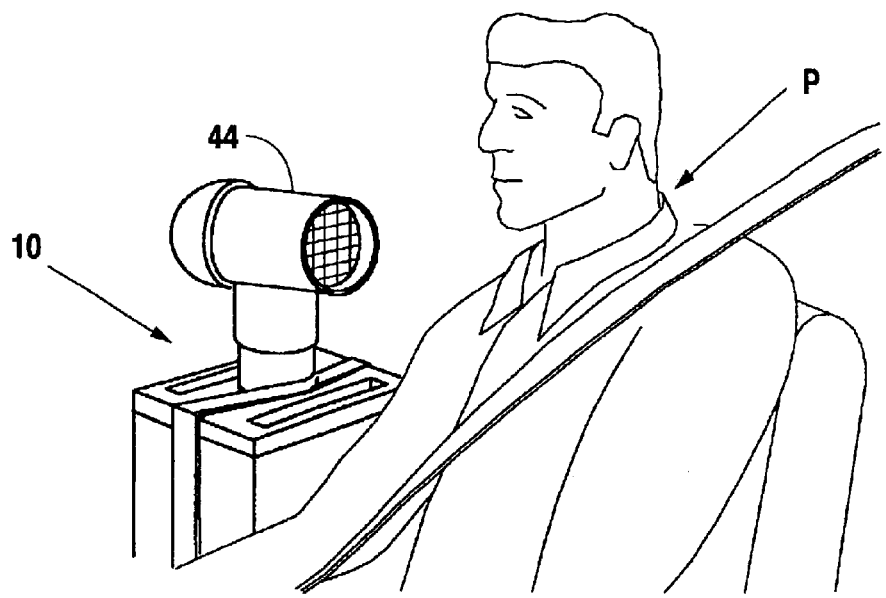
FIG. 9 is a perspective view of Applicant's air cooling device in use.

FIG. 9 illustrates Applicant's heat reduction system (10) being used in the cabin of a light aircraft. The cool air outlet nozzle (44) is pointed at the seated pilot's head and shoulders to provide relief thereto. The unit is placed in the seat next to the pilot and strapped in with the aircraft's seatbelt system.

Figure 10:
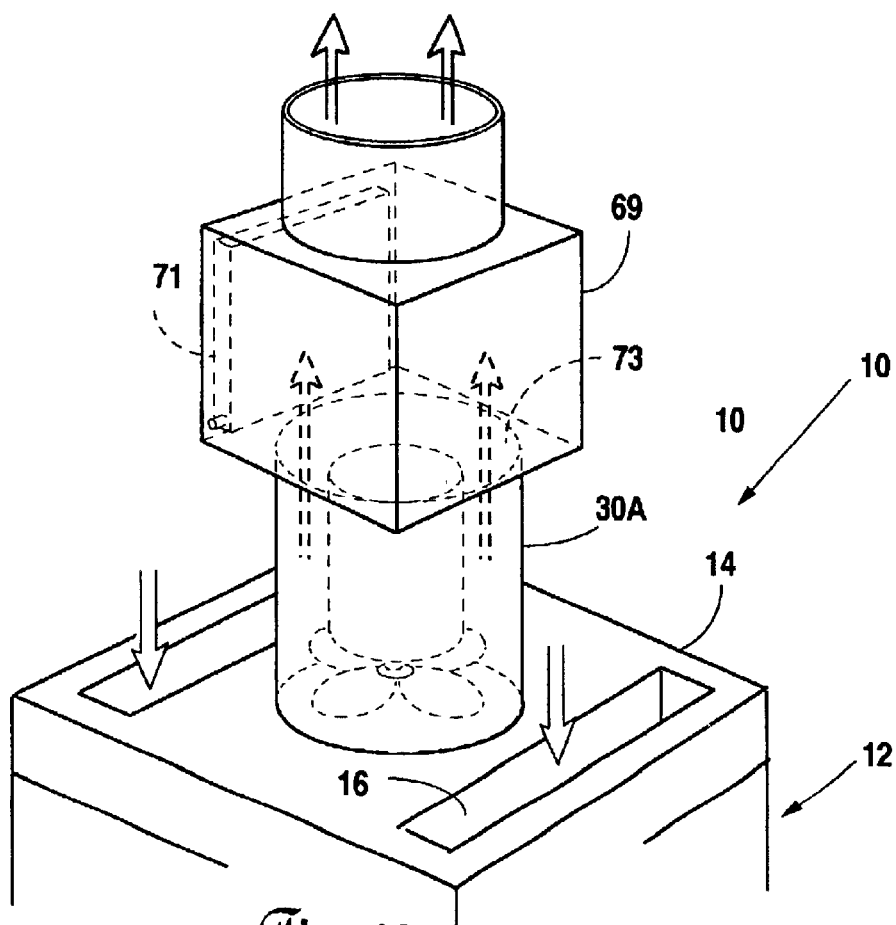
FIG. 10 is a partial view in perspective, the anti-back flow valve of Applicant's present invention.

FIG. 10 illustrates a unit having an anti-backflow valve (69) situated adjacent to blower motor (29). The purpose of the anti-backflow valve (69) is such that when one or more of a multiplicity of motors (see FIG. 7) are not in use while the rest are operating, the anti-backflow valve prevents air from flowing backward through that motor's duct to bypass the substrate and go out to the unit uncooled. Anti-backflow valve (69) has flap (71) that will normally lay across blower motor outlet (73) when the motor (30A) is not running. In this position, air cannot be secluded through out (73) when another motor is running, yet when motor (30A) is turned on, flap (71) will allow cool air to the ductwork downstream. Note anti-backflow valve (69) will work even with one motor, if the motor is off, to prevent warm air from entering the box through the motor duct.

FIG. 11 illustrates a floor mounted cooler unit (10C) with housing (77) that is similar to the earlier embodiment except that each outlet nozzle has its own blower motor and fan 30B, 30C, 30D, 30E. Each motor typically has its own on/off switch (73A, B, C and D) and rheostat (75A, B, C and D) to control the motor speed. These motors may run off the electrical system of the vehicle or will be provided with their own power such as a battery (not shown). This embodiment typically does not use an endothermic substrate.

Figure 11A:
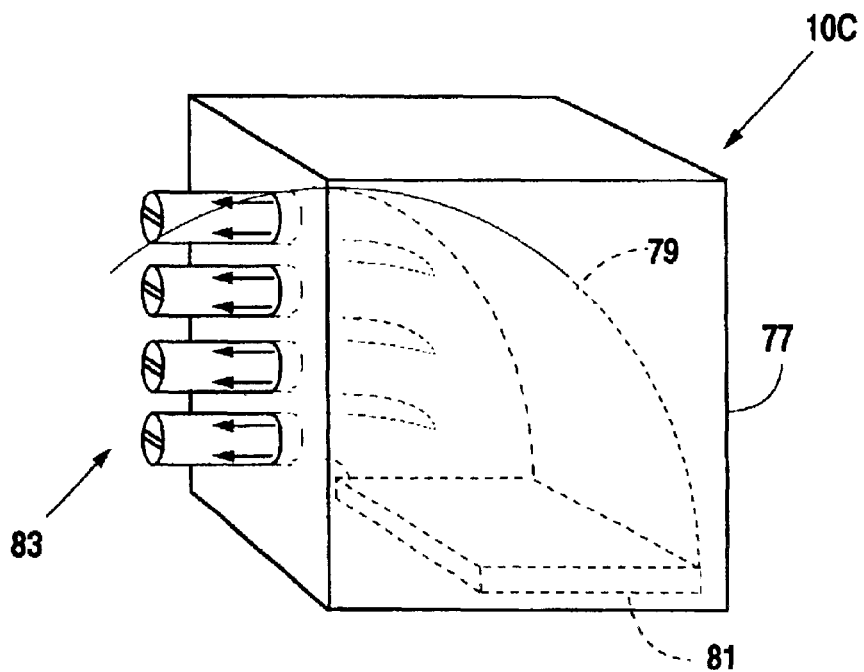
FIGS. 11A, 11B and 11C are alternate preferred embodiments of Applicant's present invention.

FIG. 11A shows that housing (77) of the cooling unit (10C) illustrated in FIG. 11 may include a plenum chamber (79) with an HEPA filter (81) filtering the air coming from outside container (77) through the plenum and out into the tubing (83). The unit should be set on the floor where typically the coolest air in the enclosure will be located, and the container may be used without a cooling substrate. The unit may be used for keeping surgeons cool in the operating room of a hospital.

Figure 11B:
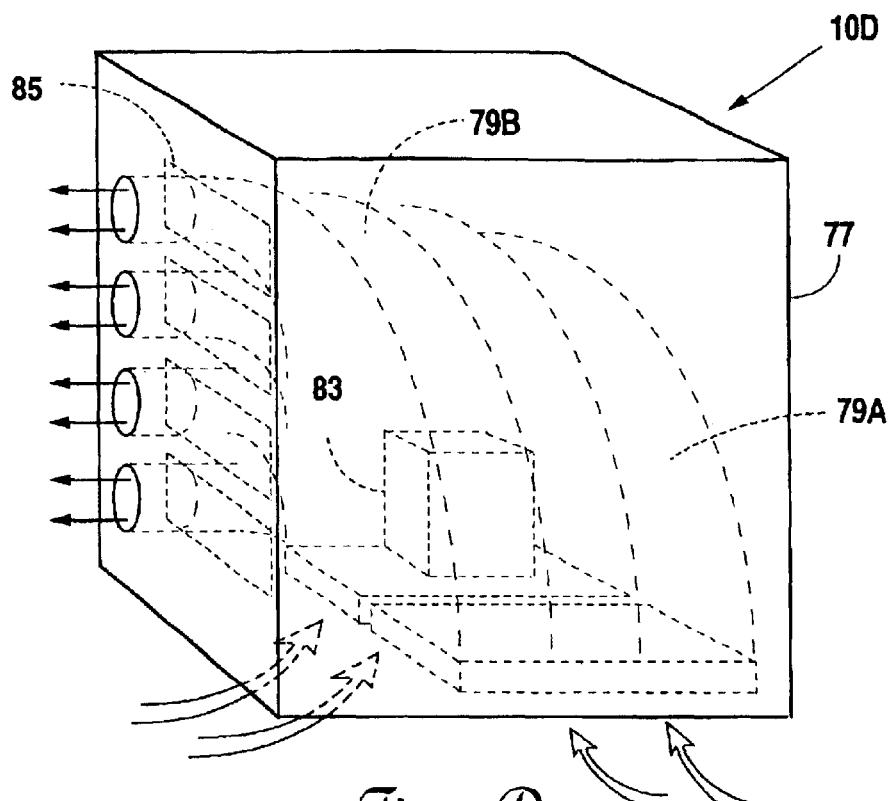
Figure 11C:
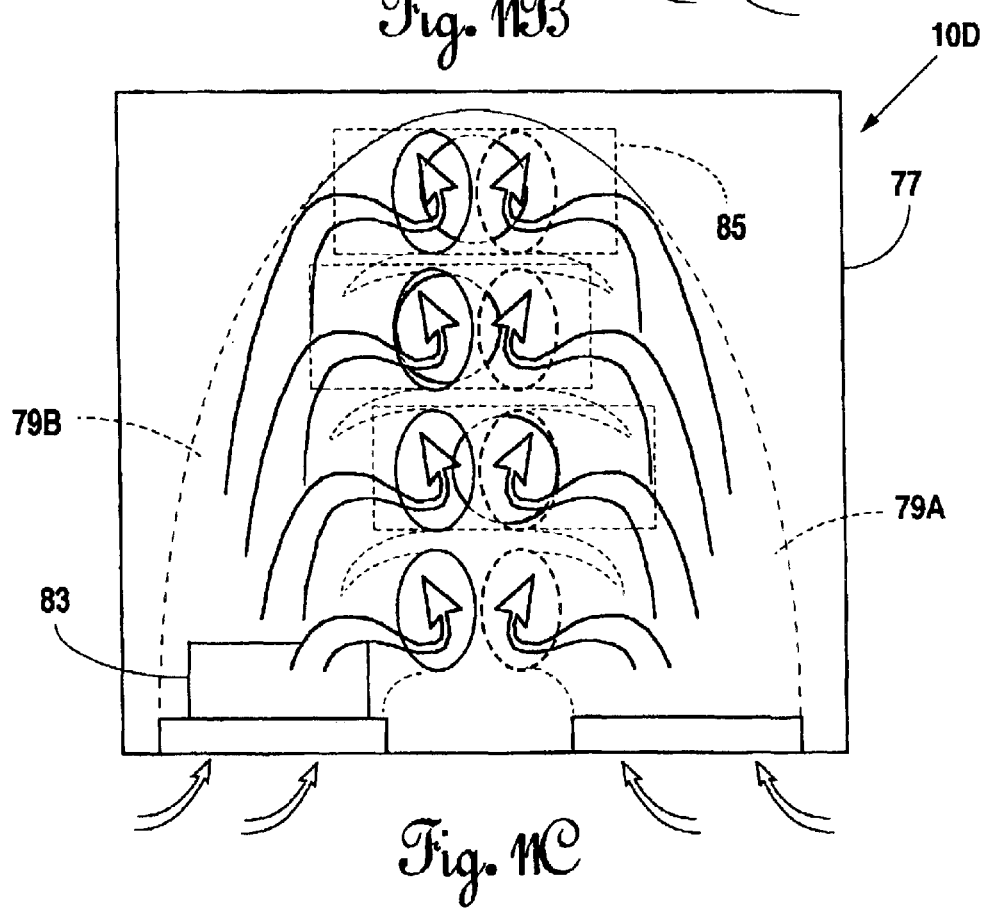

FIG. 11B illustrates a variation of Applicant's alternate preferred cooling device (10D) illustrated in FIGS. 11 and 11A. In this unit, the remote individually operated motors, (30B–E) draw air through container (77) which has a pair of plenums (79A) and (79B), both drawing filtered air from the room or cabin with a mixing slide (85) in the wall of the unit for mixing air coming from the two plenums. In one of the plenums is mounted a standard commercial off-the-shelf refrigeration or cooling coil (83) of an air conditioning or cooling unit. While plenum (79A) pulls uncooled air in through the filter, the other (79B), has air the cooling coil (83) as it goes to the user. Each motor is connected to the tube which connects to the slides (85) or mixing valves allowing individual settings based on a desired percentage of cooled and noncooled air. This mixing combined with the rheostat control of the air velocity allows a number of individual users to adjust their microenvironment to their own individual comfort level.

Figure 12:
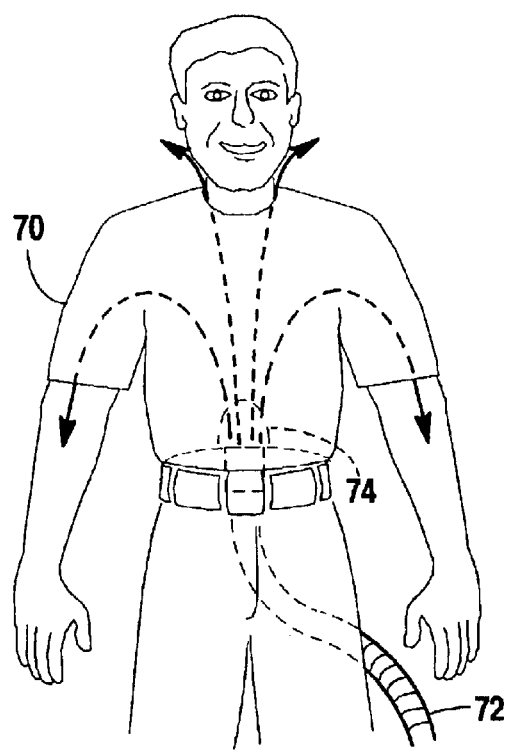
FIG. 12 is an alternative preferred embodiment of a cooling device for use with microenvironmental cooling of an individual.

Applicant also provides herein, with reference to FIG. 12, yet another use of an invention related to cooling devices of the type anticipated herein or of any other type that will provide cool airflow through a cool air duct (72). The embodiment of the invention set forth in FIG. 12 provides for a cool air duct (72) to be attached between an article of clothing (70) of an individual, such as a shirt, wherein the outlet or mouth (74) of the cool air duct is inserted between the body of the individual and the shirt or other article of clothing (70). Applicant refers to this new invention as microenvironment cooling and is intended to provide cool air in that layer of air immediately adjacent the skin of the user. It is that layer of air that requires cooling and, where cooling capacity of a unit providing the cooling is limited, it is important that this air boundary immediately adjacent the skin of the user is cooled. It is important in microenvironmental cooling to cool the air layer directly adjacent the skin as compared to an entire airmass in which an occupant is located. There are a number of places in which microenvironment cooling may be effective. These include the cabin of an aircraft or other vehicle and the operating room in a hospital, where often a surgeon (see FIG. 15) must work under hot lights.

Figure 13A:
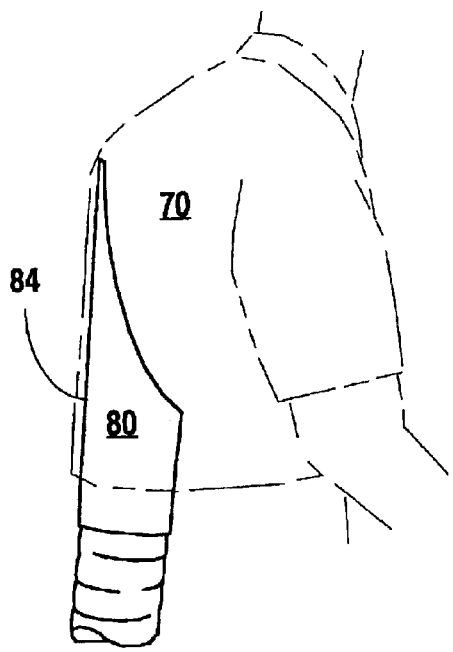
Figure 13B:
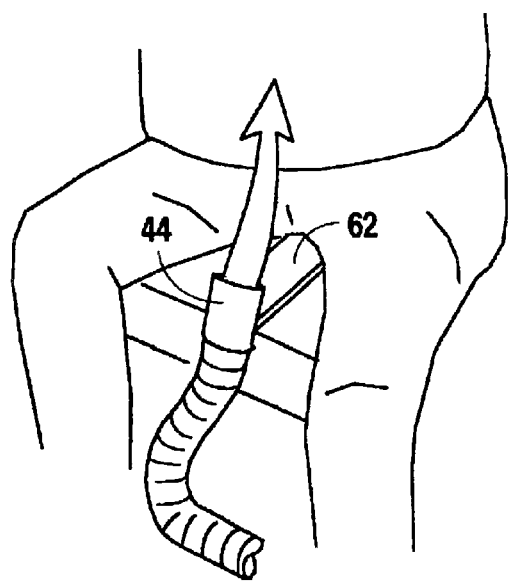
Figure 15:
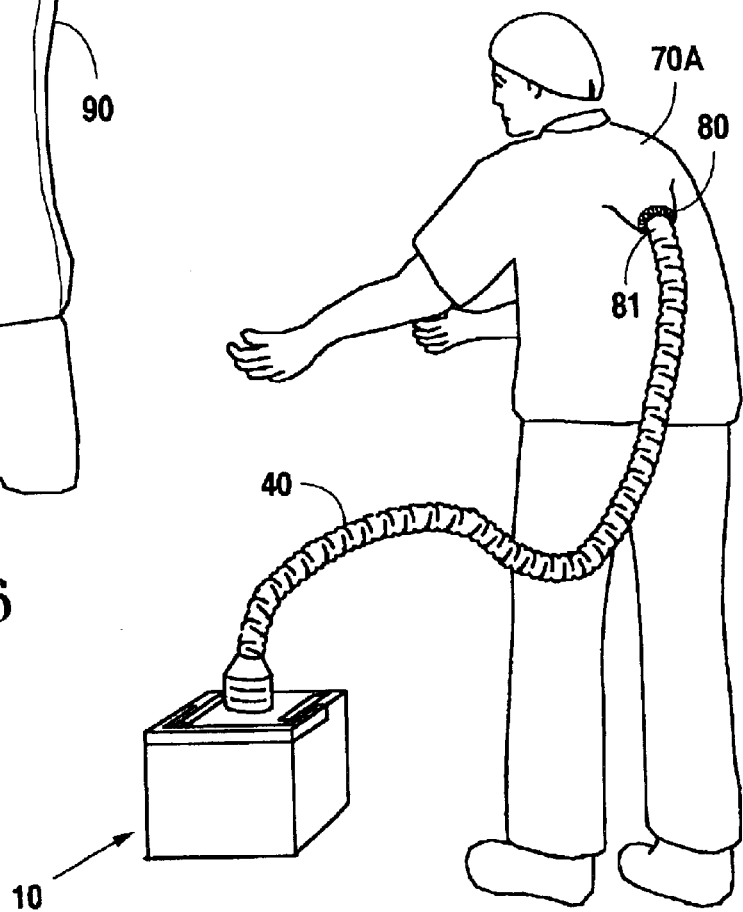
FIG. 15 is an alternate preferred embodiment of Applicant's novel device wherein the nozzle engages an article of clothing of the user for micro cooling.

In FIGS. 13A, 14 and 15, Applicant illustrates the use of custom designed microenvironmental nozzles (80) for insertion beneath an article of clothing (70). FIG. 14 provides one such custom nozzle (80) which nozzle includes a belt hook (82) for engagement with a belt of the user as well as, optionally, a blower (29A) with blower motor and fan incorporated within the nozzle (80). Note that this nozzle (80) also includes a tongue (84) which tongue may be used to keep the clothing such as the shirt off the skin of the user and provide a ready path for the cool air coming out of the outlet (86) of nozzle (80).

FIG. 15. Illustrates applicants heat reduction system 10 including cool air distribution ducts (40) used with a custom nozzle (80) and custom designed shirt (70A) wherein the nozzle and shirt are positively engaged to one another as by elastic (81) or stitching or any other means.

Figure 16:
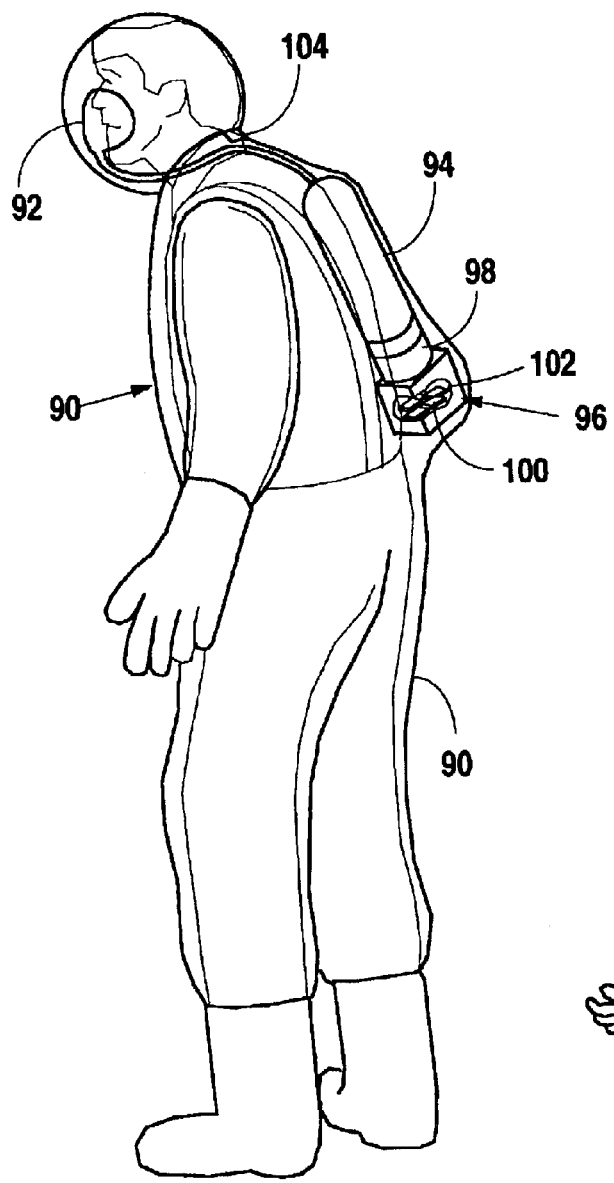
FIG. 16 is yet another adaptation of Applicant's air cooling device in a microenvironmental cooling adaptation.

FIG. 16 illustrates another aspect of Applicant's invention which may be used by a firefighter. In this aspect of the invention, Applicant provides a metallized protective suit (90) which covers the entirety of the body of the user, such as a firefighter. The firefighter wears an oxygen mask (92) and oxygen bottle (94) beneath the suit (90). There is a dry ice pack (96) within the suit with a blower motor (98) to circulate air around the dry ice (100) which is located within the container (102) of the dry ice pack (96). There are pressure differential releasing valves (104) that may be located at the neck, wrist or ankles to keep pressure in the suit constant and prevent it from overblowing as well as for keeping a constant flow of fire suppressing gas, such as $CO_2$, emanating around the firefighter.

FIGS. 16A through 20 illustrate an alternate preferred embodiment of Applicant's novel portable air cooling device (10). In this alternate preferred embodiment, several ends are achieved. First, Applicant provides a small, light, portable air cooling device. Further, Applicant provides a novel means for maintaining an air flow through ice contained in the air cooling device which air flow maximizes the contact between the ice and the air passing through the device so as to maximize cooling. Applicant's novel portable air cooling device also provides for easy refill of the ice and also a means to avoid spilling of water created by the ice.

These advantages and others are achieved in a portable air cooling device (10) as illustrated in FIGS. 16 through 20. This portable air cooling device may be used in vehicles including the cabin of a small aircraft or in the interior of a recreational vehicle or "RV or any other suitable place." Further, this alternate preferred embodiment also provides all of the advantages of the previous embodiment and as such may also be used in the operating room of a hospital, in conjunction with the cooling gown, vests or blankets that are provided in FIGS. 21A through 23B. Indeed, even when Applicant's novel portable air cooling device is used in the cabin of a vehicle, it may be engaged with a vest, gown or blanket, which would in turn be worn or draped over the user to provide a cooling flow of air thereto.

In general, the novel alternate preferred embodiment illustrated in the accompanying figures shows a portable air cooling device comprised of primarily two sections, insulated housing (112) typically having a lid (114) thereon, the housing for sitting atop and engaging, as set forth in more detail below, a base (120). The insulated housing is adapted to receive ice therein and as a means for providing airflow therethrough, such as with a blower (116) having a blower outlet (118). The insulated housing is typically comprised of four sidewalls (112a through 112d), bottom walls (112e), top walls (112i) which may have a slot (112j) therein (for receipt of the lid (114)) and lower corners (112k). It is seen that the insulated housing (112) may be generally rectangular so as to have four sidewalls. Further, it is seen that insulated housing (112) has bottom walls, herefor, configured to define a grate opening (112L). Bottom walls are slanted so ice (I) sitting in the interior of the insulated housing will, at it melts, be centered on a grate (113) fitted to cover the grate opening (112L). Grate (113) will hold back the ice and maintain it in the interior of the insulated housing. Further, because the bottom walls are slanted towards the grate opening, the ice will collect there, under the impetus of gravity and, air flow being directed as it is through the grate opening from below upwards toward the top of the insulated container and out the blower outlet (118), it is seen that the effect, as the ice melts to drip into the base (112) is to direct the air flow across and through the ice. The further effect of centering the grate in the grate opening at the low point on the insulated housing is to cause the ice to collect there. This improves the efficiency of the cooling.

The insulated housing is typically physically separable from the base. Base (120) is designed to engage the insulated housing in a manner such that the water from the ice melting on the grate drips into the interior thereof and will collect therein.

Base (120) is seen to have a bottom wall (120a), sidewalls (120b), pillars (120c), top wall (120e), having notches (120f) therein, and the top wall further having air cutouts or ports (120g). Functionally therefore, the base is designed to receive on a top surface thereof the insulated housing. Furthermore, the insulated housing is dimensioned, and the base is dimensioned to receive the insulated housing such that, when the two are joined, the grate opening is below top wall (120e) of the insulated housing and water dripping through the grate will be contained within the interior of the base and spilling and sloshing of water is prevented by having a top wall (120e) above the grate opening (120L) of the housing.

The base is also adapted to receive the insulated housing thereon in a stable and efficient manner, and to hold in position the insulated housing to the base so that the grate opening is properly centered in the top wall in the manner set forth in the illustrations and in these specifications. One means of achieving such a positioning is provided in the use of pillars (120c) and notches (120f). This stable engagement is achieved by dimensioning the opening in the top wall on the base and the insulated housing such that lower corners (112k) of the housing fit into bosses in pillars (120c) as set forth in FIG. 16 and, so engaged, the edges between the four walls of the bottom wall seat in the four notches (120f).

Figure 16A:
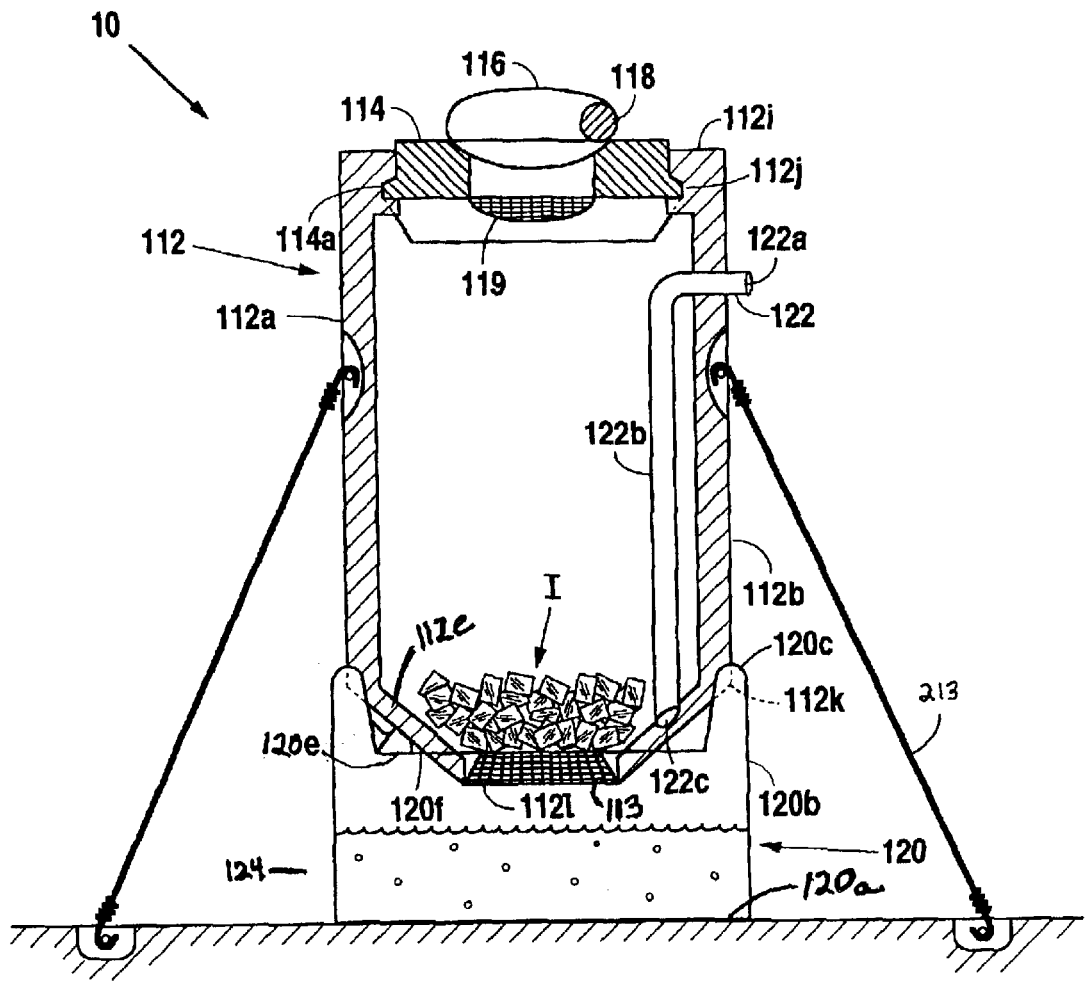
FIG. 16A illustrates a side elevational cutaway view of an alternate preferred embodiment for Applicant's novel cooling device attached to a support surface.
Figure 17:
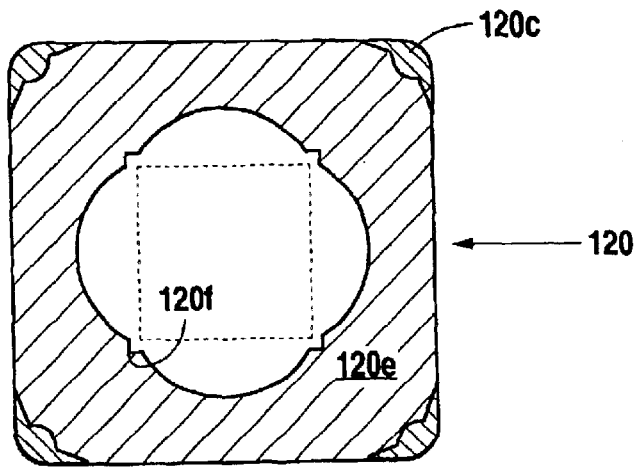
FIG. 17 is a top elevational view of the base of the alternate preferred embodiment of Applicant's present invention as set forth in 16A above.
Figure 18:
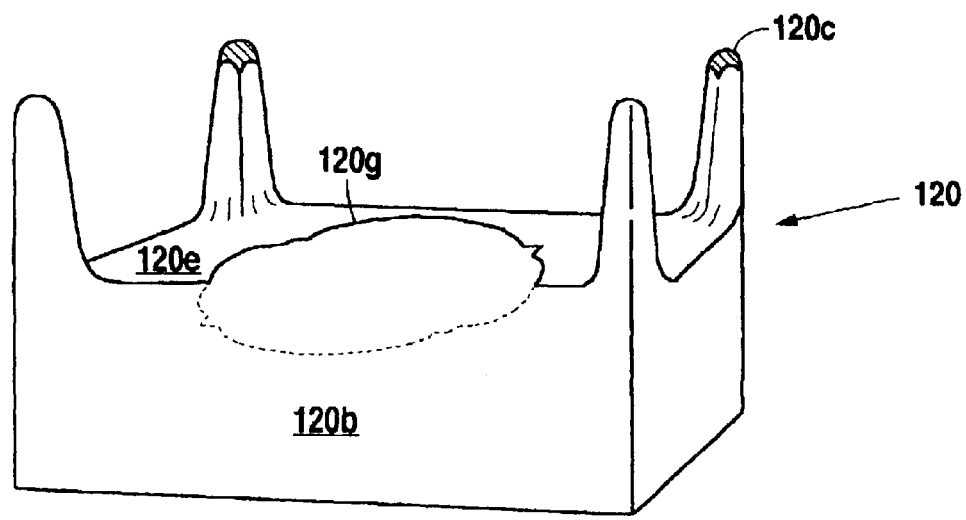
FIG. 18 is a side perspective view of the base of FIG. 17.

Applicant's novel portable air cooling device (10) provides a separate container for ice, shown in FIG. 16A as insulated housing (112) and a separate container for ice melt, base (120). Moreover, the containers are centered one to the other with the insulated housing above the base to allow fluid flow as the ice melts of the cold water into the base under the impetus of gravity. Further, a convenient tool-less friction fit is provided to engage the housing to the base. Typically, the interior of the base will define a volume that is capable of receiving melt from all of the ice that can be placed in the interior of the housing, without reaching the underside of the top wall of the base. A typical volume for the interior of the housing may be 50 liters or up to 200 liters for larger requirements. Typical units (base and housing) may be 8–12" wide, 12–16" long and up to 30" high.

Turning now to the means of air flow, blower (116) is provided with a blower outlet (118) for creating a low pressure within the interior of the housing. This is done by a blower fan in ways known in the art or set forth herein. A blower grate (119) is provided adjacent the blower for preventing ice or other debris from entering the blower. The blower may be part of a lid (114), or be mounted to a lid. The blower may be powered by any convenient power supply. The lid (114) may include tongue (114a) for engaging the pair of slots (112j) in the top walls of the insulated housing. This provides an easy slide-on and slide-off lid that is still an effective air seal as the tongues engage the slots snugly.

In a first version of Applicant's alternate preferred embodiment, air from the surroundings will be drawn in through the grate (113) up through the ice and out blower outlet (118). It may be directed by means illustrated in other portions of this application, to the trunk and/or face of a user through a cool air conduit or a multiplicity of conduits directed to a multiplicity of users. On the other hand, air at blower outlet (118) may be directed, through an appropriate tube or conduit, to a garment such as a vest or a blanket or the like. Such a garment or blanket or the like may contain a multiplicity of holes to cool a user on which such member is draped. This version of Applicant's novel portable air cooling device (10) would be a "total loss" system in which air is cooled and then applied to a user. However, Applicant also provides a recirculation means for use in a version of Applicant's air cooling device in which air is pumped from a blower into a member, such as an inflatable vest, gown or a blanket, or even a "mummy bag" and some of the cool air is lost through small perforations in the member, designed to provide cool air to the wearer, but which member also contains a return tube for bringing air back to a recirculation pipe (122) (see FIG. 16A). The recirculation pipe would receive air from a remote member which air would be part of a "semi-closed" system and which return air would be directed through a recirculation pipe, typically with an intake port (122a) near the top of the sidewalls of the housing. The recirculation pipe (122) may include a down tube (122b) in the interior of the housing which down tube ends in outlet port (122c), which outlet port (122c) is typically located in one of the bottom wall sections (112e). In this "semi-closed" system, some of the air originally leaving blower outlet (118) will be expelled from a pressurized member through holes to cool a wearer, while other air will flow back into recirculation pipe (122) to be cooled as it flows through ice located in the interior of the housing and is expelled into the space between the bottom walls of the housing and the top wall of the base—that is, is expelled into the interior of the base to join ambient air which is being drawn into the grate opening under the impetus of the low pressure generated by blower fan (118) on the interior of the housing.

Figure 19:
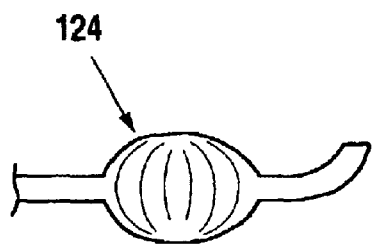
FIG. 19 is a cut away view inside elevation of a hand operated water pump for use of Applicant's novel cooling device.

Applicant also provides a drain (124) adjacent the bottom of the sidewalls of the base to drain water collected therein. Drain may be connected, as illustrated in FIG. 19, to a handheld squeeze pump (124) to provide an outlet for drinking water or the like. Elastic cord tiedowns (213) will hold the air cooling device (10) to a support surface to stabilize the device.

Figure 20:
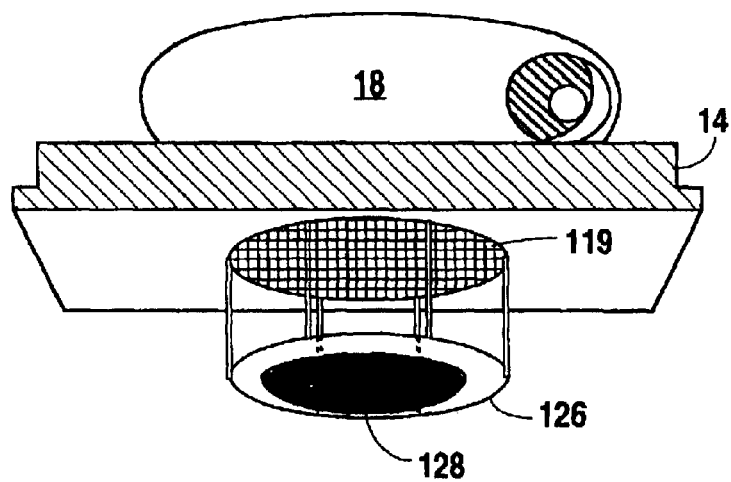
FIG. 20 is a perspective view of a lid and blower for use with Applicant's insulated housing which lid and blower is adapted to prevent or ice from entering the blower.

FIG. 20 illustrates a protective grate (126) containing a disk (128) designed to "float" with in the grate such that when the air cooling device is in an upright position, the disk will lay at the bottom of the grate, but if the device is tipped over, disk (128) will slide up and cover motor intake grate (I 19). This would allow aerobatics if the cooler were uses in an aircraft interior.

Figure 21A:
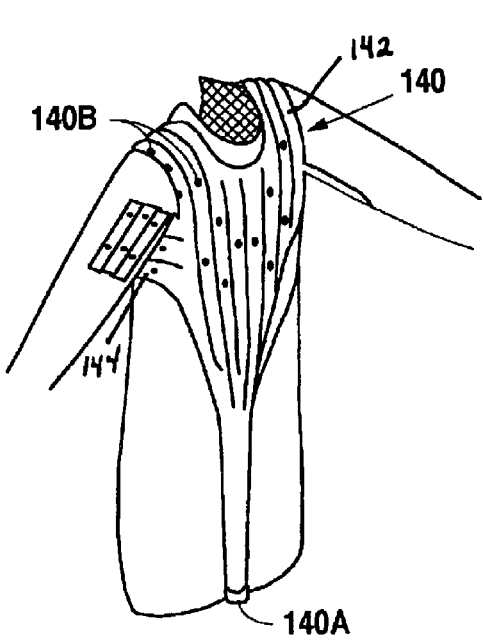
FIG. 21A is a perspective view of an inflatable vest for attachment to a coolant source.
Figure 21C:
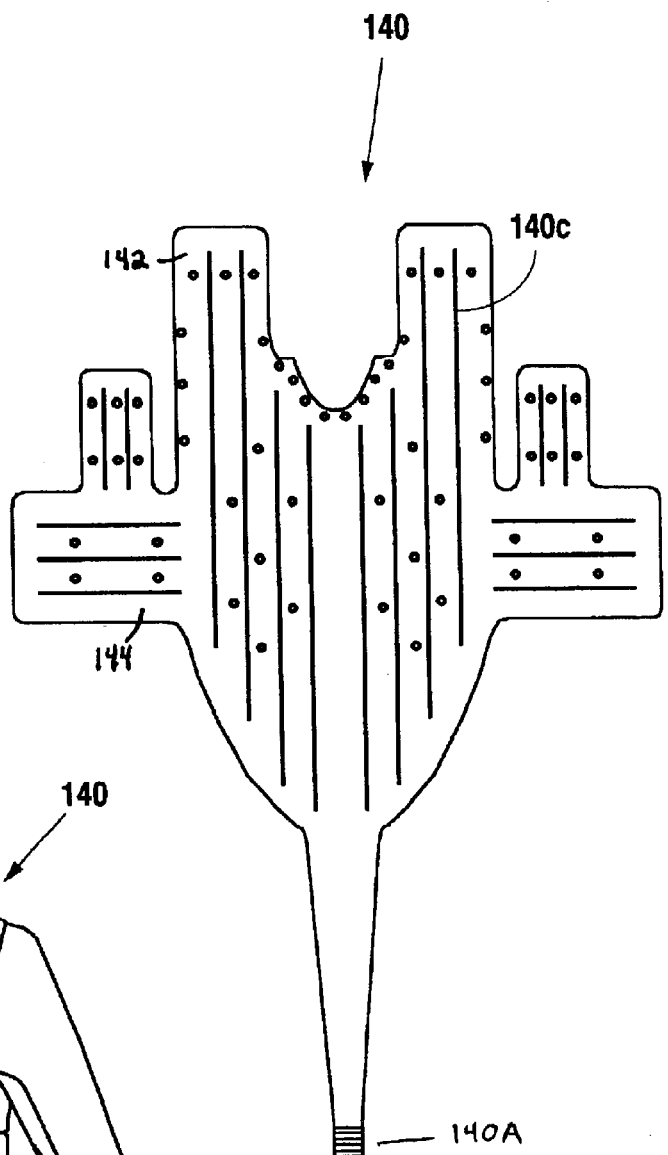
FIG. 21C is a top elevational view of the vest of FIGS. 21A and B laid out rather than illustrated as one by user.
Figure 21B:
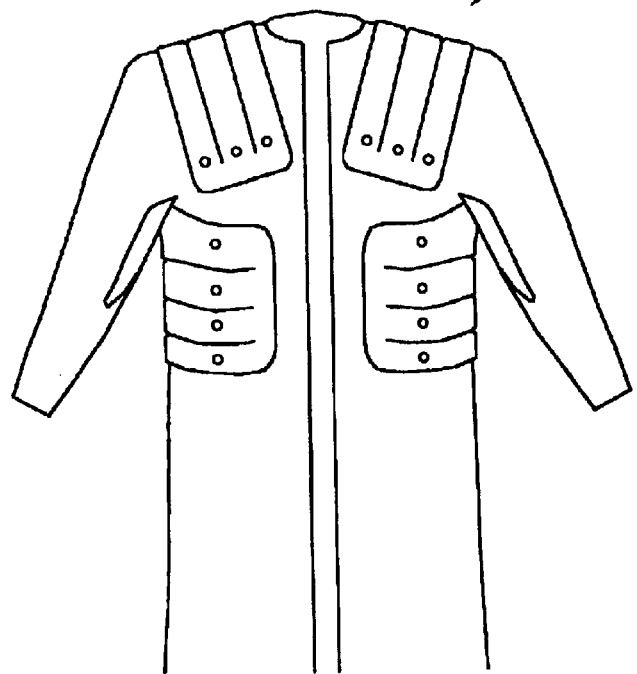
FIG. 21B is a back elevational view of a vest for use with the coolant source.

FIGS. 21A, 21B and 21C all illustrate a vest (140), the vest having a port (140A) attached thereto for receipt of cool air from Applicant's novel portable air chilling device (10). The vest is intended for use where needed, for example, underneath a surgeon's scrub gown. Perforations or holes (140B) are provided in the underside of the vest to provide cool air to the body of the wearer. The underside holes cool the thorax, the neck and shoulders. Portions of the vest wrap over the shoulder (142) and fold across the armpit (144) to cool the underside of the upper arm. FIG. 21A provides a front view of the vest and FIG. 21B illustrates a back view of the vest. FIG. 21C shows the novel vest in an unfolded position and shows fusion seams (140C) that break up the interior of the vest into a multiplicity of channels so as to distribute cool air received through port (140A) from the blower to a number of points on the body.

Thus, FIG. 21C illustrates a typical pattern for the portion of the vest adjacent the body. The vest may be made of plastic coated paper or any other suitable material. The paper may be fused to a light plastic member along the exterior perimeter thereof to form a disposable vest having a plastic sheet on one side and a paper sheet on the other. Illustrated is a vest with a "total loss" system. However, a second port or return port (not shown) may be provided if a "semi-closed" system is desired.

Figure 22:
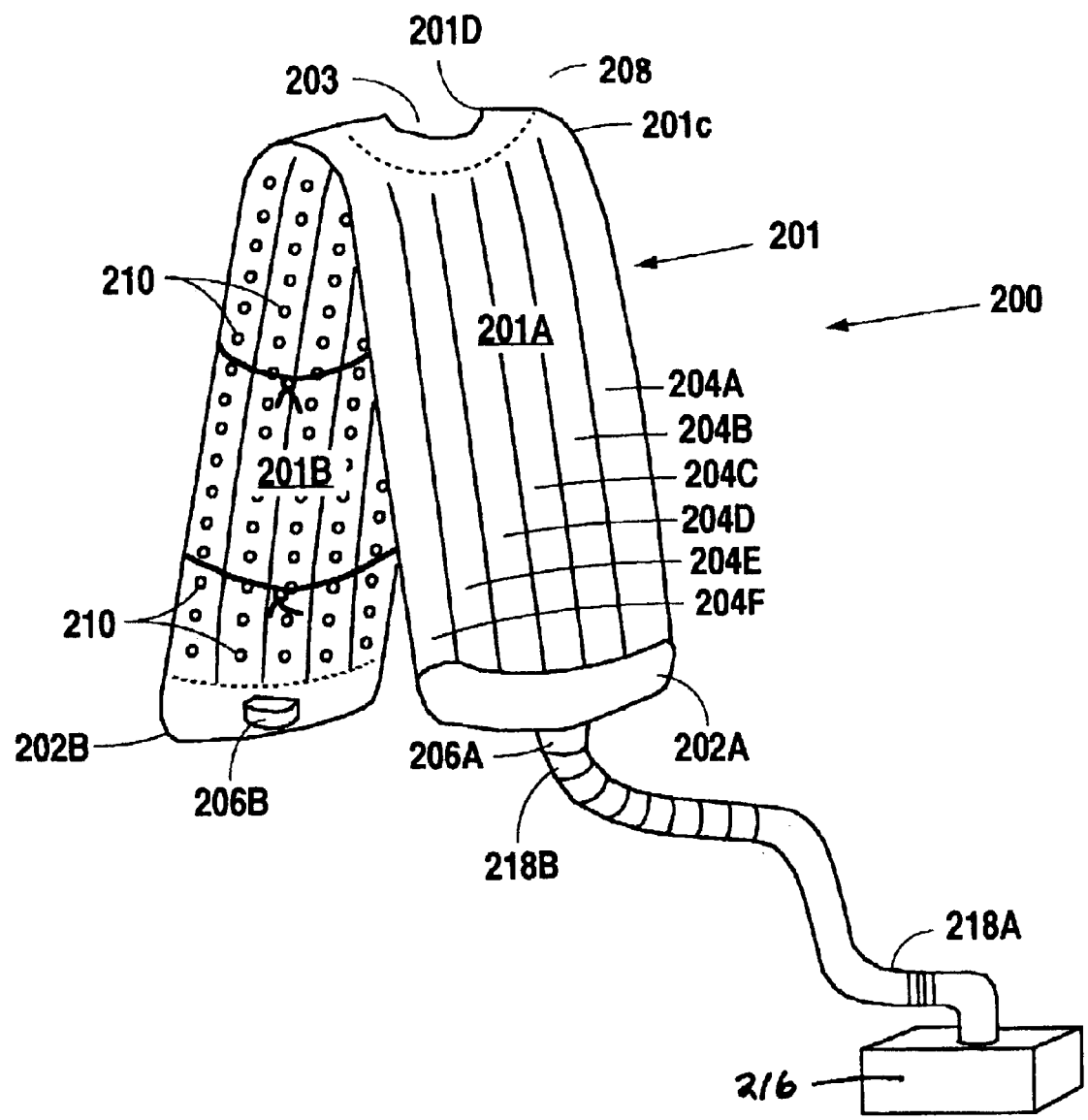
FIG. 22 is a alternate preferred embodiment of a garment for use with a cooling device in side perspective view.

FIG. 22 illustrates a gown (201) to be worn by an individual, which gown (201) is attached to a cool air source including a container (216), via hose (218). The container (216) may be similar to any of the cooling devices disclosed above or may be any other suitable source of cool air. Gown (201) may, in a preferred embodiment, be rectangular and comprised of outer member (201A) and inner member (201B), the two members similarly dimensioned and joined at an outer perimeter (201C), as well as at an inner perimeter (201D), the inner perimeter defining a head hole (203).

Any sealing means, such as glue, heat or the like, may be used to seal the inner and outer members. The inner and outer members may be joined so as to define in members (202A and 202B) and longitudinal members (204A through 204F). The function of end members, longitudinal members or other sealing between the inner and outer members is to create chambers within the gown to channel cool air received into the gown uniformly throughout the gown so as to provide uniform cooling to the wearer. The gown may include an inflatable segment (208). The underside may contain a multiplicity of small holes of perforations (210) therein. Gown (201) may be include one or more ports (206A and 206B). Both ports may be provided to bring cool air from a cool air source into the gown or one may be used for a return port as in a "semi-closed" system. The gown is typically worn like a surgeon's gown and it may be tied off by ties.

Figure 22A:
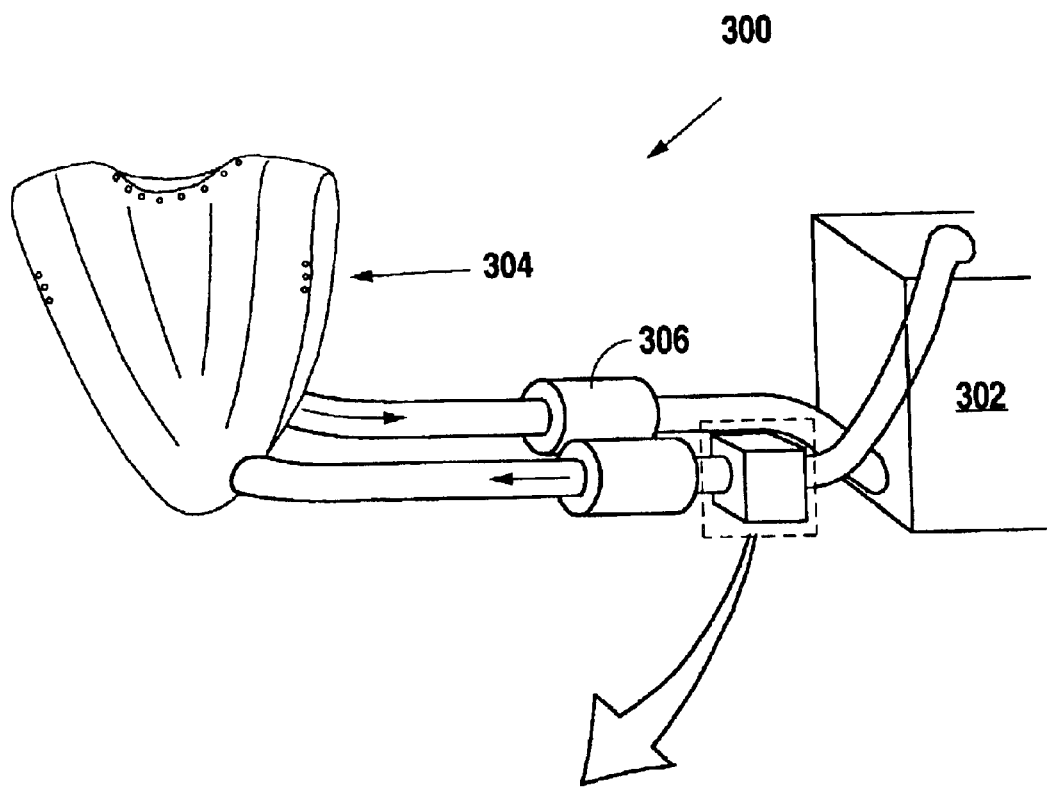
FIG. 22A is an alternate preferred embodiment of Applicant's present invention inside perspective view featuring an ice chest conduit motor and temperature regulator for moving cool air to and from a garment such as a vest.
Figure 22B:
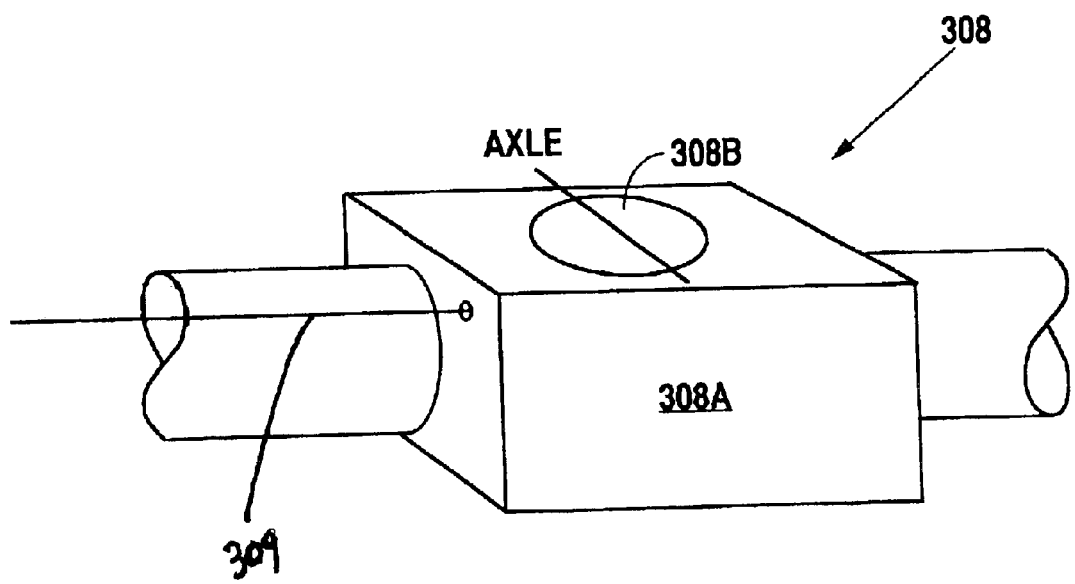
FIG. 22B is a side perspective view of the temperature regulator box for use with the alternate preferred embodiment of Applicant's cooling system featured in FIG. 22A.

FIGS. 22A and 22B illustrate a system (300) including an ice chest (302) or other ice containing insulated container for providing cool air in a semi-closed system to a vest or other article (304). Motors (306) may be provided in the "out" and/or "return" lines as illustrated in FIG. 22A and a temperature regulator (308) may be provided in the "out" (cool air) line to the vest. Temperature regulator box (308) may include a rectangular housing (308A) for receiving air and passing air there through in a wire line (309) controlled butterfly valve (308B) which may be open to allow warmer air to mix with cool air. These are member which may be included in a system for cooling an individual, which system contains a perforated garment, bag or blanket to be used adjacent the wearer. Cool air may be provided by the unique devices enclosed herein or any other suitable device.

Figure 23A:
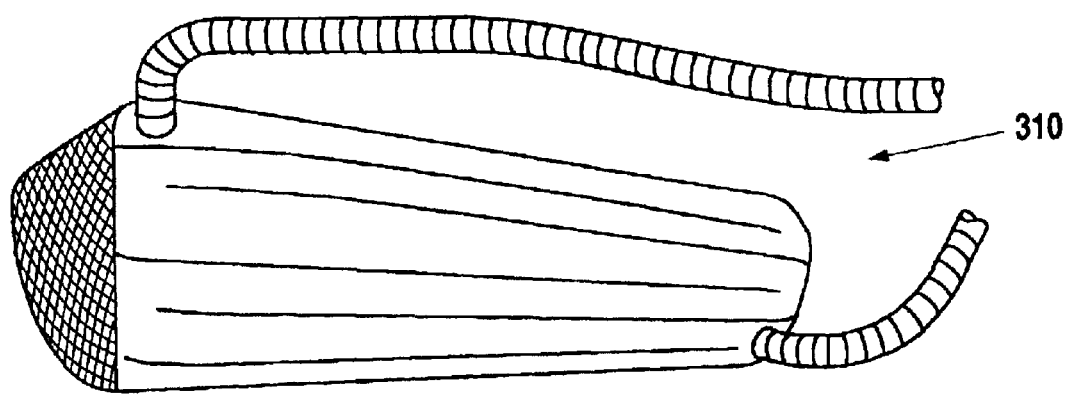
FIG. 23A is a top elevational view of a sleeping bag for use with Applicant's novel cooling system.
Figure 23B:
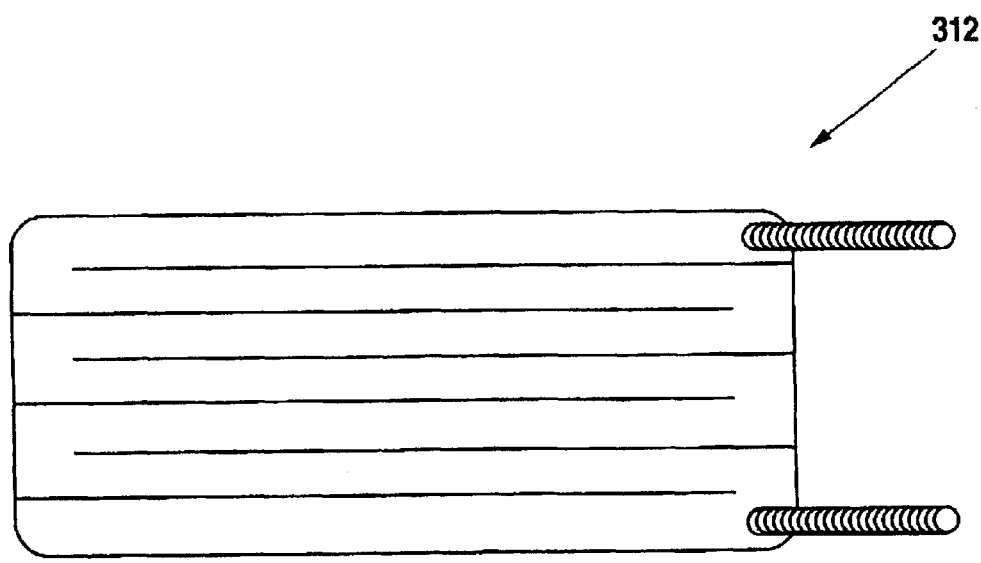
FIG. 23B is a cooling blanket in top perspective view, for use with Applicant's present invention.

FIGS. 23A and 23B illustrate inflatable members for receiving cool air including: a sleeping bag (310) here "mummy bag" and a rectangular cooling blanket (312).

Figure 24:
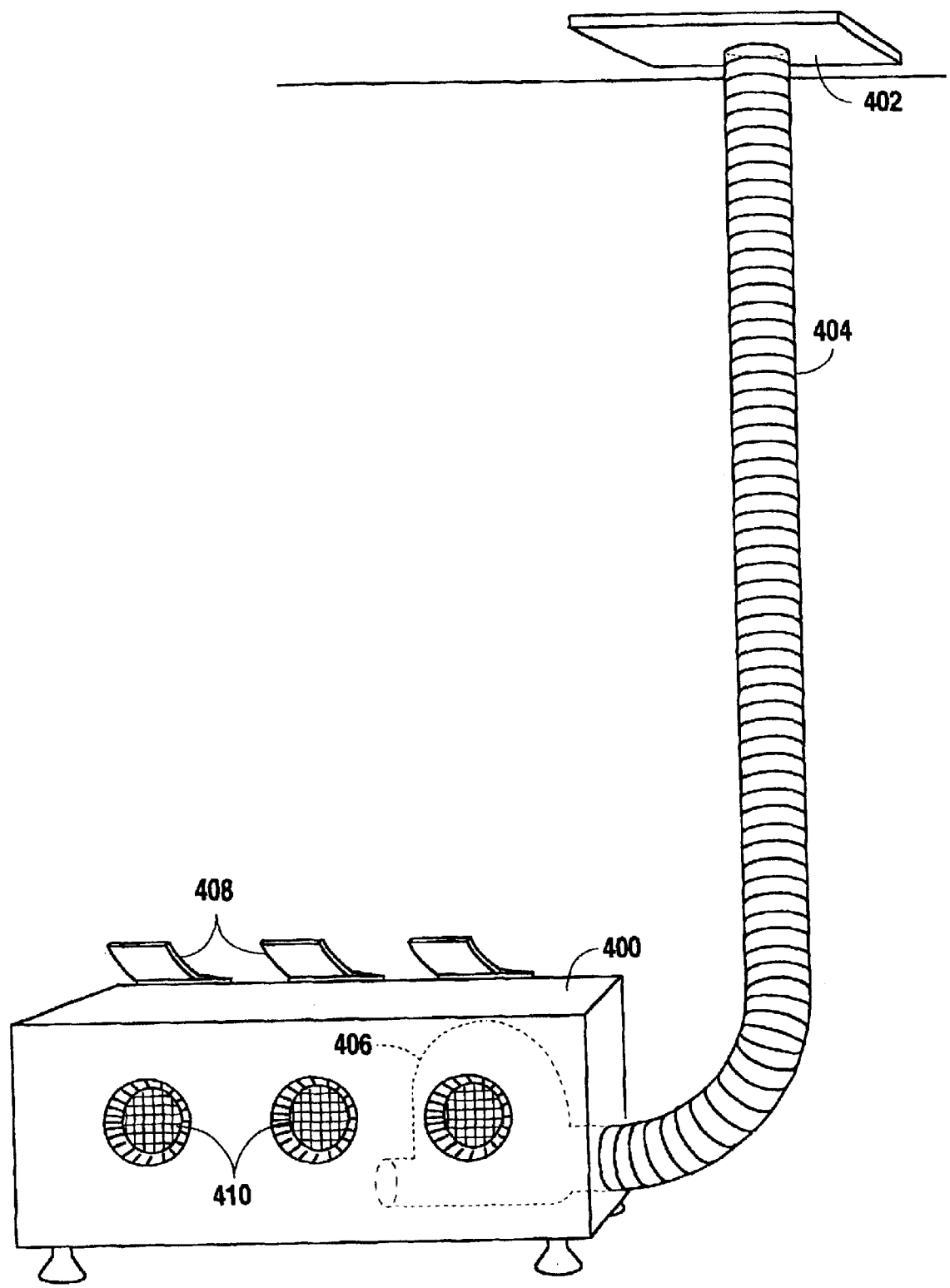
FIG. 24 illustrates a configuration that allows air to be drawn into a blower box 400 from a room air conditioner outlet 402 to a flexible duct 404. The blower box 400 includes a blower motor for 406 and one more foot control pedals for 408 to control the flow and pressure to one or more blower box outlets 410 which can be connected by conduits to one or more surgical garments for cooling of the surgeons.

FIG. 24 illustrates a configuration that allows air to be drawn into a blower box (400) from a room air conditioner outlet (402) to a flexible duct (404). The blower box (400) includes a blower motor for (406) and one or more foot control pedals (408) to control the flow and pressure to one or more blower box outlets (410) which can be connected by conduits to one or more surgical garments for cooling of the surgeons.

Applicant's cooling blanket, sleeping, vest and other cool air receiving inflatable garments set forth herein provide cool micro environments to a wearer. They typically include an impermeable outer shell and a perforated or porous inner lining which will allow cool air to filter to the user to maintain thermal barrier against outside heat. A blower will typically produce sufficient cool air flow to keep the garment filled. One may recirculate previously cooled air to the cooling chamber (via ice, dry ice or even an air conditioning coil) to be cooled again and again. Two advantages are achieved by applicants cool air inflated garments. First, air is a good insulator and thus an effective thermal barrier is created between the wearer and his environment. Second, active cooling occurs (in the "total loss" or "semi-closed" systems) by providing a draft of cool air directed to the skin.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

What is claimed is:

1. A system for providing cool air to an individual user, the system comprising:

an insulated housing adapted to contain an endothermic substance therein;

a blower for engaging the insulated housing and adapted to draw air through the housing;

an inflatable member with a receiving port for receiving cool air from the insulated housing, the inflatable member shaped to lay adjacent the body of the user and including a multiplicity of inflatable compartments in gaseous communication with one another and conduit means for delivering air between the insulated housing and the inflatable member.

2. The system of claim 1 wherein the inflatable member includes a multiplicity of perforations therein, adapted to provide cool air to the user.

3. The system of claim 2 wherein the inflatable member includes one of the following:

a blanket;

a mummy bag; or a vest.

4. The system of claim 2 wherein the inflatable member is comprised of one of paper or plastic or a combination thereof.

5. The system of claim 2 wherein the inflatable member includes a return port for returning some air from the inflatable member to the insulated housing.

6. The system of claim 1 further including means to engage an air conditioner outlet.

7. The system of claim 1 wherein the inflatable member is a surgeon's gown.

8. The system of claim 2 wherein some of the multiplicity of perforations of the inflatable member are adapted to be jets and wherein said jets are directed to the head of the wearer.

9. The system of claim 7 wherein the surgeon's gown includes a multiplicity of perforations.

10. The system of claim 8 wherein at least some of the multiplicity of perforations of the surgeon's gowns are adapted to be jets directed to the head of the wearer.

11. The system of claim 1 further including a temperature regulator box.

12. The system of claim 7 further including a temperature regulator box.

13. The system of claim 7 wherein the surgeon's gown is comprised of one of paper or plastic or a combination thereof.

14. The system of claim 7 wherein the inflatable member includes a return port for returning some air from the inflatable member to the inflated housing.

15. The system of claim 1 wherein the multiplicity of inflatable compartments includes a multiplicity of tubes, at least some of the multiplicity of tubes having a different width than others of the multiplicity of tubes.

16. The system of claim 1 wherein at least part of the inflatable member is adapted to lay against a torso.

17. The system of claim 1 wherein the blower includes apparatus to regulate the amount of air provided by the blower to the flatable member.

18. The system of claim 17 wherein the apparatus is adapted to be operated by the foot of a user.

19. The system of claim 1 wherein the blower includes a port, wherein the port includes a female coupling ring, the system further including a flexible tube, the flexible tube included a male member to seal in the couple with the female coupling ring of the port of the blower.

20. The system of claim 1 wherein the blower includes at least one port, the at least one port including the valve for controlling the amount of air flowing through the port.

21. The system of claim 20 wherein the valve includes a foot pedal.

22. The system of claim 1 wherein the blower is capable of receiving air through a filter.

* * * * *